US011568650B2

(12) United States Patent
Huang et al.

(10) Patent No.: US 11,568,650 B2
(45) Date of Patent: Jan. 31, 2023

(54) LEARNING ACROSS 2D AND 3D PIPELINES FOR IMPROVED OBJECT DETECTION

(71) Applicant: Woven Planet North America, Inc., Los Altos, CA (US)

(72) Inventors: Qiangui Huang, Palo Alto, CA (US); Meng Gao, San Francisco, CA (US)

(73) Assignee: WOVEN PLANET NORTH AMERICA, INC., Los Altos, CA (US)

( * ) Notice: Subject to any disclaimer, the term of this patent is extended or adjusted under 35 U.S.C. 154(b) by 155 days.

(21) Appl. No.: 17/121,400

(22) Filed: Dec. 14, 2020

(65) Prior Publication Data
US 2022/0188554 A1   Jun. 16, 2022

(51) Int. Cl.
*G06V 20/58* (2022.01)
*G06K 9/62* (2022.01)
*G06T 17/10* (2006.01)
*G06T 7/73* (2017.01)
*G06N 3/04* (2006.01)
*G06T 7/50* (2017.01)

(52) U.S. Cl.
CPC .......... *G06V 20/58* (2022.01); *G06K 9/6293* (2013.01); *G06N 3/0454* (2013.01); *G06T 7/50* (2017.01); *G06T 7/74* (2017.01); *G06T 17/10* (2013.01); *G06T 2210/21* (2013.01)

(58) Field of Classification Search
CPC .... G06V 20/58; G06K 9/6293; G06N 3/0454; G06T 7/50; G06T 7/74; G06T 17/10; G06T 2210/21
See application file for complete search history.

(56) References Cited

U.S. PATENT DOCUMENTS

2022/0036612 A1 * 2/2022 Gilboa-Solomon ... G06V 10/82

OTHER PUBLICATIONS

Qi, et al., Frustum PointNets for 3D Object Detection from RGB-D Data, Stanford University, arXiv:1711.08488v2, [cs.CV], 15 pages.

* cited by examiner

*Primary Examiner* — Christopher M Brandt
(74) *Attorney, Agent, or Firm* — Christopher G. Darrow; Darrow Mustafa PC

(57) ABSTRACT

A method includes accessing a training sample including an image of a scene, depth measurements of the scene, and a predetermined 3D position of an object in the scene. The method includes training a 3D-detection model for detecting 3D positions of objects based the depth measurements and the predetermined 3D position, and training a 2D-detection model for detecting 2D positions of objects within images. Training the 2D-detection model includes generating an estimated 2D position of the object by processing the image using the 2D-detection model, determining a subset of the depth measurements that correspond to the object based on the estimated 2D position and a viewpoint from which the image is captured, generating an estimated 3D position of the object based on the subset of the depth measurements, and updating the 2D-detection model based on a comparison between the estimated 3D position and the predetermined 3D position.

20 Claims, 9 Drawing Sheets

LEARNING ACROSS 2D AND 3D PIPELINES FOR IMPROVED OBJECT DETECTION

TECHNICAL FIELD

This disclosure relates generally to autonomous or semi-autonomous vehicles, and, more specifically, to learning across 2D and 3D pipelines for improved object detection for the autonomous or semi-autonomous vehicles.

BACKGROUND

Autonomous or semi-autonomous vehicles may typically rely upon on a number of sensors (e.g., LiDARs, cameras, radars, and so forth) for determining an operational design domain (ODD), or an environment in which the vehicle may be optimally and safely deployed. For example, the particular sensors determined to be suitable for the ODD may be part of a perception system that act as the "eye" of the vehicle, continuously monitoring and perceiving the environment surrounding the vehicle. Specifically, in order to safely and efficiently navigate the world, an autonomous or semi-autonomous vehicle has to accurately perceive any objects that may become apparent within its drive path and/or any relevant traffic communications that may be conducive to the safe operation of the vehicle. This may include, for example, cars, pedestrians, cyclists, traffic lights, traffic signs, lane markings, lane boundaries, construction cones, road debris, vegetation, wildlife, and so forth. It may thus be useful to provide techniques to improve object detection.

DESCRIPTION OF EXAMPLE EMBODIMENTS

Figure 1:
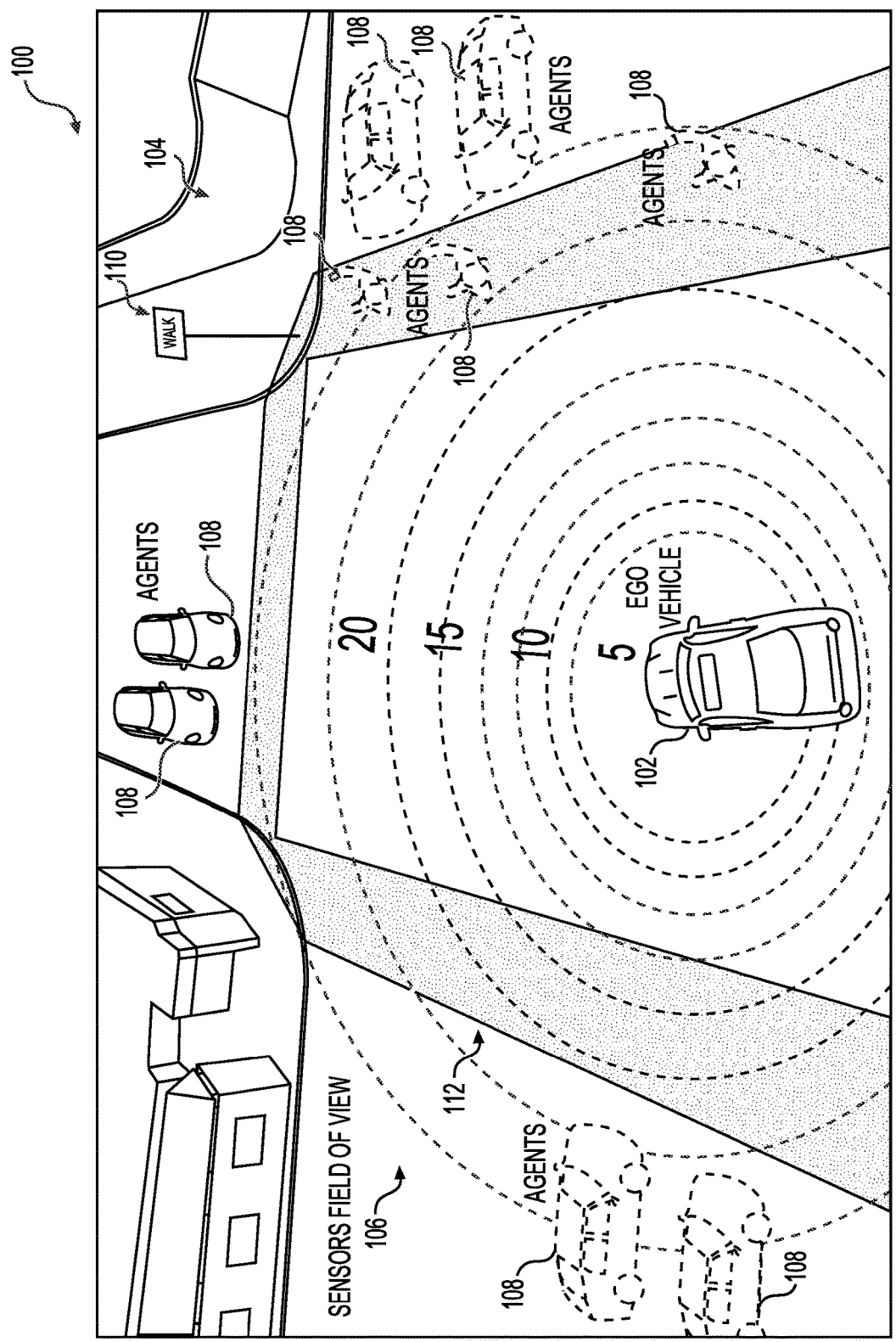
FIG. 1 is an example vehicle perception system.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Certain embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, may be claimed in another claim category, e.g., system, as well. The dependencies or references back in the attached claims are chosen for formal reasons only. However, any subject matter resulting from a deliberate reference back to any previous claims (in particular multiple dependencies) may be claimed as well, so that any combination of claims and the features thereof are disclosed and may be claimed regardless of the dependencies chosen in the attached claims. The subject-matter which may be claimed comprises not only the combinations of features as set out in the attached claims but also any other combination of features in the claims, wherein each feature mentioned in the claims may be combined with any other feature or combination of other features in the claims. Furthermore, any of the embodiments and features described or depicted herein may be claimed in a separate claim and/or in any combination with any embodiment or feature described or depicted herein or with any of the features of the attached claims.

Autonomous or semi-autonomous vehicles may typically rely upon on a number of sensors (e.g., LiDARs, cameras, radars, and so forth) for determining an operational design domain (ODD), or an environment in which the vehicle may be optimally and safely deployed. For example, the particular sensors determined to be suitable for the ODD may be part of a perception system that act as the "eye" of the vehicle, continuously monitoring and perceiving the environment surrounding the vehicle. Specifically, in order to safely and efficiently navigate the world, an autonomous or semi-autonomous vehicle has to accurately perceive any obstructions that may become apparent within its drive path and/or any relevant traffic communications that may be conducive to the safe operation of the vehicle. This may include, for example, cars, pedestrians, cyclists, traffic lights, traffic signs, lane markings, lane boundaries, construction cones, road debris, vegetation, wildlife, and so forth.

Thus, as it may be appreciated, the perception system of autonomous or semi-autonomous vehicles and its associated sensors may be relied upon to operate in real-time, with high fidelity and precision, and in a complementary manner. For example, the LiDAR pipeline data (e.g., 3D point clouds, 3D bird's eye view (BEV) representations) may provide very accurate depth information, but may not provide color information. Thus, the LiDAR pipeline data alone may not be reliably utilized to determine traffic communications, such as red lights or green lights. Similarly, the camera pipeline data (e.g., 2D RGB images or frames) may be particularly useful in providing color information, but may not capture the depth of a particular object. Thus, the camera pipeline data may not be particularly suitable in localizing objects in the environment of the vehicle. Accordingly, in some instances, advanced perception systems may perform an early fusion between the LiDAR pipeline data (e.g., 3D point clouds, 3D BEV representations) and camera pipeline data (e.g., 2D RGB images) to supplement 2D object-detection and 3D object-detection, and may utilize 2D human annotations and 3D human annotations to train the 2D object-detection and 3D object-detection pipelines, respectfully. However, in certain instances, providing sufficient human annotation data in order to accurately train the 2D object-detection and 3D object-detection pipelines may be immensely costly, cumbersome, and potentially impracticable, especially when scaled, for example, for all of the possible objects and environments in which the vehicle may encounter. Specifically, the 3D data used to conventionally train the 3D object-detection pipeline is significantly more costly to process than corresponding 2D data used to train the 2D object-detection pipeline. As a result, 2D data may be more readily available than 3D data for object-detection pipeline training. Additionally, obtaining sufficient human annotation data becomes even more difficult when both 2D and 3D human annotations are imperative for any given training sample.

Specifically, the 2D and 3D joint object-detection pipelines may be provided to leverage both 2D (R)ed, (B)lue, (G)reen data and 3D depth data to detect objects of interest in both 2D and 3D space. For example, in addition to the 2D RGB data, the 2D detector may utilize corresponding 3D depth data to improve its ability to detect objects in 2D space. Similarly, in addition to 3D depth data, the 3D detector may utilize corresponding 2D RGB data to improve its ability to detect objects in 3D space. The 2D and 3D joint object-detection pipelines may be trained based on annotated 2D and annotated 3D training datasets (e.g., the ground truth of where 2D and 3D bounding boxes appear). However, in some embodiments, providing sufficient human annotation data in order to accurately train the 2D object-detection and 3D object-detection pipelines may be costly, cumbersome, and potentially impracticable, especially when scaled, for example, for all of the possible objects and environments in which the vehicle may encounter. Additionally, obtaining sufficient human annotation data becomes even more difficult when both 2D and 3D human annotations are imperative for any given training sample. That is, without the presently disclosed techniques, a particular training sample for training each of the 2D object-detection pipeline and the 3D joint object-detection pipeline would otherwise have to include both 2D and 3D annotations to properly train the respective 2D and 3D object-detection pipelines. It may be thus useful to provide techniques to train each of the 2D object-detection pipeline and the 3D joint object-detection pipeline based on partial annotation training data, such that even for a particular training sample including only 3D annotation data, the 3D annotation data alone may be utilized as the ground truth data to train each of the 2D object-detection pipeline and the 3D joint object-detection pipeline.

Accordingly, the present embodiments include an object detection and classification framework for training 2D and 3D joint object-detection pipelines utilized to estimate 2D and 3D bounding boxes for each object of interest within a 2D RGB image, a 3D point cloud, or a 3D BEV representation utilizing only partial annotation data. That is, even for a particular training sample including only 3D annotation data, the 3D annotation data alone may be utilized as the ground truth data to train each of the 2D object-detection pipeline and the 3D joint object-detection pipeline. Indeed, in certain embodiments, a training sample may include an RGB image and a corresponding 3D point cloud, but, because—in some instances—one or more training samples may include only 3D ground truth data for 3D detection and not 2D ground truth data for 2D detection, the present techniques allow both the 3D object-detection and 2D object-detection pipelines to nevertheless be trained based only on the 3D ground truth data for 3D detection.

For example, in certain embodiments, the object detection and classification framework may access a training sample including an image of a scene, depth measurements of the scene, and a predetermined 3D position of an object in the scene. The object detection and classification framework may then train 1) a 2D-detection model for detecting 2D positions of objects and 2) 3D-detection model for detecting 3D positions of objects based on the depth measurements of the scene and the predetermined 3D position of the object. For example, in certain embodiments, training the 2D-detection model for detecting 2D positions of objects may include generating an estimated 2D position of the object within the image by processing the image using the 2D-detection model. In certain embodiments, generating the estimated 2D position of the object may include determining, by a 2D pipeline neural network of the 2D-detection model, a 2D set of feature vectors from the image of the scene. In some embodiments, the 2D set of feature vectors may correspond to the object in the image of the scene. In some embodiments, a 2D detector of the 2D-detection model may then generate the estimated 2D position of the object in the image of the scene based on the 2D set of feature vectors received from the 2D pipeline neural network and a 3D set of feature vectors received from a 3D pipeline neural network of the 3D-detection model. For example, the 3D set of feature vectors may correspond to the object in the depth measurements of the scene.

In certain embodiments, the object detection and classification framework may then include determining a subset of the depth measurements of the scene that correspond to the object based on the estimated 2D position of the object within the image and a viewpoint from which the image is captured. For example, in some embodiments, determining the subset of the depth measurements that correspond to the object may include utilizing a point-based detector of the 2D-detection model to generate a viewing frustum based on the estimated 2D position of the object, a pose associated with a sensor that captured the image of the scene, and the depth measurements of the scene. In certain embodiments, the object detection and classification framework may then generate an estimated 3D position of the object based on the subset of the depth measurements.

For example, in some embodiments, generating the estimated 3D position of the object may include utilizing the point-based detector of the 2D-detection model to determine whether one or more of the depth measurements lying within the viewing frustum corresponds to the estimated 2D position of the object. In certain embodiments, in response to determining that the one or more of the depth measurements lying within the viewing frustum corresponds to the estimated 2D position of the object, the point-based detector of the 2D-detection model may then generate the estimated 3D position for the one or more depth measurements. In certain embodiments, the object detection and classification framework may then update the 2D-detection model based on a comparison between the estimated 3D position of the object and the predetermined 3D position of the object. For example, in some embodiments, updating the 2D-detection model may include updating one or more parameters of the 2D detector of the 2D-detection model, the 2D pipeline neural network, and the 3D pipeline neural network based on the results of the comparison between the estimated 3D position of the object and the predetermined 3D position of the object.

In certain embodiments, as previously noted, either in serially or in parallel, the object detection and classification framework may then train the 3D-detection model for detecting 3D positions of objects based on the depth measurements of the scene and the predetermined 3D position of the object. For example, in certain embodiments, training the 3D-detection model for detecting 3D positions of objects may include generating an estimated 3D position of the object by processing the depth measurements of the scene using the 3D-detection model. For example, in some embodiments, generating the estimated 3D position of the object may include determining, by the 3D pipeline neural network, the 3D set of feature vectors from the depth measurements of the scene. In some embodiments, the 3D set of feature vectors may correspond to the object in the depth measurements of the scene. In certain embodiments, a 3D detector of the 3D-detection model may then generate the estimated 3D position of the object in the depth measurements of the scene based on the 3D set of feature vectors received from the 3D pipeline neural network and the 2D set of feature vectors received from the 2D pipeline neural network.

In certain embodiments, the object detection and classification framework may then update the 3D-detection model based on a comparison between the estimated 3D position of the object and the predetermined 3D position of the object. For example, in some embodiments, updating the 3D-detection model may include updating one or more parameters of the 3D detector, the 3D pipeline neural network, and the 2D neural network based on the results of the comparison between the estimated 3D position of the object and the predetermined 3D position of the object. In this way, the present techniques may be provided to train each of the 2D object-detection pipeline and the 3D joint object-detection pipeline based on partial annotation training data, such that even for a particular training sample including only 3D annotation data, the 3D annotation data alone may be utilized as the ground truth data to train each of the 2D object-detection pipeline and the 3D joint object-detection pipeline. That is, even for a particular training sample including only 3D annotation data, the 3D annotation data alone may be utilized as the ground truth data to train each of the 2D object-detection pipeline and the 3D joint object-detection pipeline. In sum, the present techniques may not only leverage both 2D images (e.g., RGB images) and 3D point clouds (or 3D BEV representations) to improve the precision and recall of autonomous or semi-autonomous vehicle object detection and classification, but may also engender such improvements to the precision and recall in object detection and classification by training the 2D object-detection pipeline and the 3D joint object-detection pipeline based only a partial annotation dataset.

With the forgoing in mind, it may be useful to describe an example vehicle perception output 100, as illustrated, for example, by FIG. 1. In certain embodiments, the vehicle perception output 100 may include a perception output for a vehicle 102, for example, as the vehicle 102 navigates the environment 104 (e.g., urban environment, suburban environment, rural environment). For example, the vehicle perception output 100 may include a visual depiction of the perception and modeling of the environment 104 based on sensor data (e.g., LiDAR sensor data, camera sensor data, radar sensor data, inertia measurement unit (IMU) data, and so forth), as illustrated by the sensor field of views (FOVs) 106 (e.g., sensors ranges at 5 meters, 10 meters, 15 meters, 20 meters, and so forth). In certain embodiments, as further depicted by FIG. 1, the vehicle 102 may potentially encounter and/or pass nearby, for example, one or more agents 108 (e.g., dashed-line agents 108 may correspond to agents detected within the FOV 106 of the vehicle 102, while solid-line agents 108 may correspond to agents currently outside of the FOV 106 of the vehicle 102). In some embodiments, the one or more agents 108 may include any potential objects the vehicle 102 may encounter along its drive trajectory including, for example, other vehicles 102, curbs, corners, debris, wildlife, vegetation, or any of various other potential moving and/or stationary objects or obstructions. In certain embodiments, the LiDAR pipeline data (e.g., 3D point clouds, 3D bird's eye view (BEV) representations) of the perception output 100 may provide very accurate depth information, and thus may be more suitable for detecting agents 108 such as vehicles and pedestrians. Similarly, the camera pipeline data (e.g., 2D RGB images or frames) of the perception output 100 may be particularly useful in providing color information, and thus may be more suitable for detecting traffic communications 110, such as red lights or green lights, crosswalk signs, traffic signs, and lane boundaries 112. Accordingly, as will be further appreciated below, in accordance with the presently disclosed embodiments, an object-detection and classification framework may be provided for learning and inferring from both the 2D camera pipeline data and 3D LiDAR pipeline data captured or received, and may be further utilized for training the 2D and 3D joint object-detection pipelines utilized to estimate 2D and 3D bounding boxes for each agent 108 of interest within a 2D image, a 3D point cloud, or a 3D BEV presentation utilizing only partial annotation data (e.g., 3D annotation data).

Figure 2:
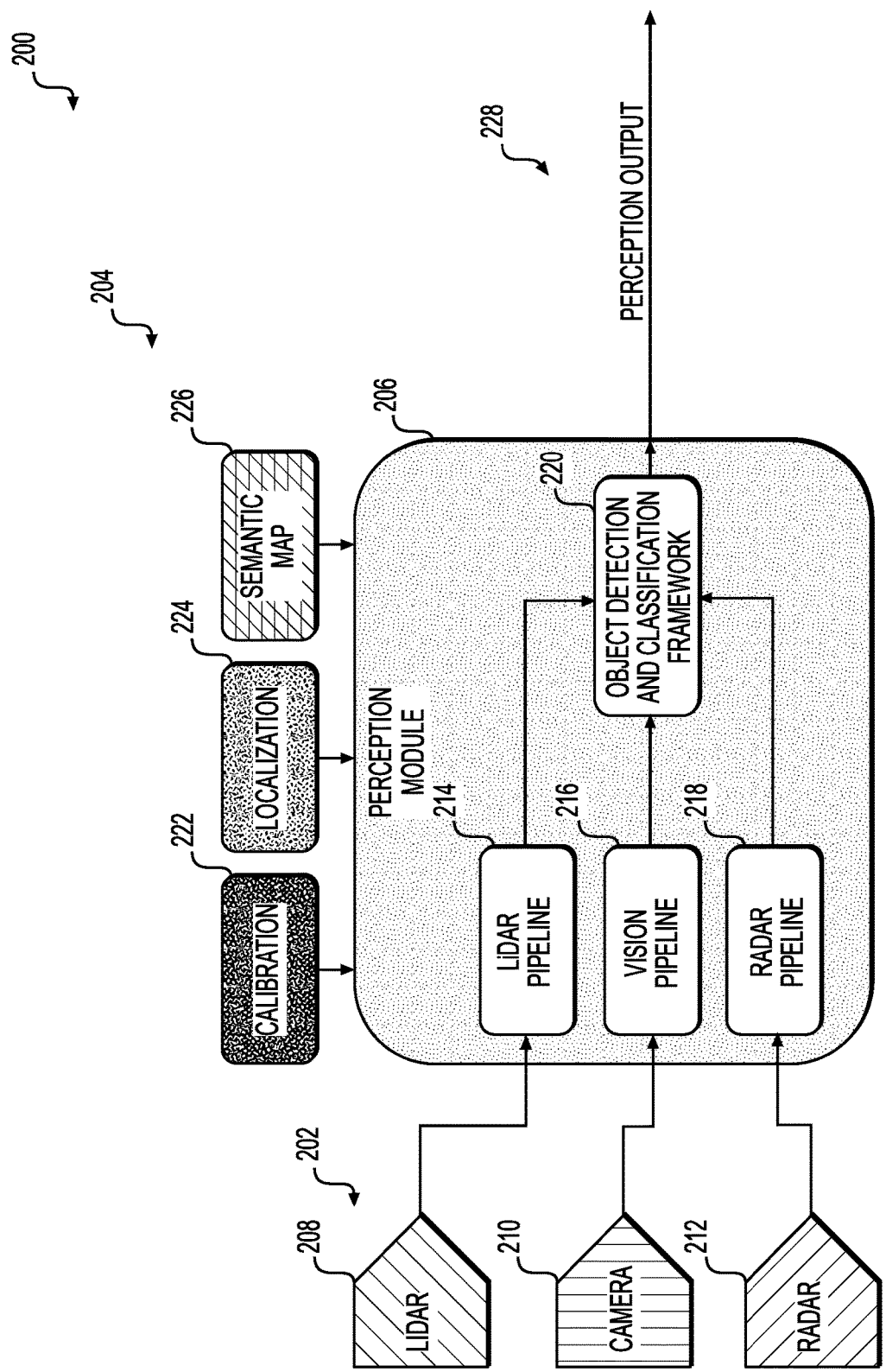
FIG. 2 is an example block diagram of a perception system, including an object detection and classification framework.

FIG. 2 illustrates an example block diagram of a perception system 200, including an object detection and classification framework to be trained for estimating 2D and 3D bounding boxes utilizing only partial annotation data, in accordance with the presently disclosed embodiments. For example, as depicted by FIG. 2, in certain embodiments, the perception system 200 may include one or more computing modules and data pipelines, such as a perception module 202, sensor and sensor data pipelines 204, and calibration and mapping data 206. In certain embodiments, the perception module 202 may be suitable for correlating and fusing the data from the LiDAR sensors 208, camera sensors 210, and radar sensors 212 to model the contextual environment 104 of the vehicle 102.

For example, in some embodiments, the perception module 202 may utilize information extracted by multiple respective LiDAR sensors 208, camera sensors 210, and radar sensors 212 to provide information that may otherwise not be available from any single sensor modality. As further depicted, the LiDAR sensors 208, camera sensors 210, and radar sensors 212 may provide their inputs to a respective 3D data pipeline 214 (e.g., LiDAR data pipeline), 2D data pipeline 216 (e.g., camera data pipeline), and radar pipeline 218. In certain embodiments, the perception module 202 may combine data from LiDAR sensors 208, camera sensors 210, and radar sensors 212 to leverage the strengths of the different sensor modalities to more accurately and precisely perceive the environment 104 surrounding the vehicle 102. Specifically, in some embodiments, the LiDAR sensors 208 and 3D data pipeline 214 (e.g., LiDAR pipeline 214) may capture and process, for example, one or more 3D point clouds, 3D BEV representations, depth maps, voxelizations, or other 3D models of the environment 104 surrounding the vehicle 102 and/or the agents 108 (e.g., vehicles 102, pedestrians, bicyclists, wildlife, vegetation, or any of various other moving and/or stationary objects) that the vehicle 102 may encounter. Similarly, the camera sensors 210 and 2D data pipeline 216 (e.g., cameras pipeline 218) may capture and process, for example, one or more 2D images (e.g., 2D RGB images) of the environment 104 surrounding the vehicle and/or the agents 108 (e.g., vehicles 102, pedestrians, bicyclists, wildlife, vegetation, or any of various other moving and/or stationary objects) that the vehicle 102 may encounter. In one embodiment, the 2D data captured by the camera sensors 210 and the 3D data captured by the LiDAR sensors 208 may include respective 2D and 3D scenes of the same portion of the environment 104 and/or the same agents 108 to be analyzed and fused together to leverage the respective strengths of the 2D data captured by the camera sensors 210 and the 3D data captured by the LiDAR sensors 208.

For example, in some embodiments, the LiDAR sensors 208 and the 3D data pipeline 214 (e.g., 3D point clouds, 3D BEV representations) may provide very accurate depth information, but may not provide color information, and thus may not be reliably utilized to determine traffic communications, such as red lights or green lights. Similarly, the camera sensors 210 and the 2D data pipeline 214 (e.g., captured 2D RGB images or frames) may be particularly useful in providing color information, but may not capture the depth of a particular object, and thus may not be particularly suitable in localizing objects in the environment of the vehicle. Thus, in some embodiments, the perception module 202 may perform an early fusion between the 3D data pipeline 214 (e.g., 3D point clouds, 3D BEV representations) and the 2D pipeline 216 (e.g., 2D RGB images) to supplement 2D object detection and 3D object detection. In one embodiment, the perception module 202 may also perform an early fusion between the 2D data pipeline 216 (e.g., 2D RGB images) and the radar data pipeline 218 (e.g., short-range radar data, mid-range radar data, long-range radar data) to supplement the 2D object detection and enhance the 2D perception data output of the perception module 202.

As further depicted in FIG. 2, in certain embodiments, the perception module 202 may also process sensor calibration data 220, localization data 224, and semantic mapping data 226 to further derive information about the contextual environment 104 and/or agents 108 surrounding the vehicle 102. For example, in some embodiments, the sensor calibration data 220 may include, for example, one or more parameters or processes utilized to inform the perception module 202 of the manner in which the LiDAR sensors 208, camera sensors 210, and radar sensors 212 may be positioned on or about the vehicle 102, and to bring the information captured (e.g., raw sensor data) by each of the LiDAR sensors 208, camera sensors 210, and radar sensors 212 into a common measurement reference frame. For example, in one embodiment, the sensor calibration data 220 may include one or more machine learning (ML) algorithms that may allow, for example, the perception module 202 to understand the manner in which the environment 104 appears from the perspective of each of the individual LiDAR sensors 208, camera sensors 210, and radar sensors 212, for example.

Similarly, in certain embodiments, the localization data 224 may include, for example, one or more processes utilized for further contextual understanding of the environment 104 surrounding the vehicle 102, such as the precise location of the vehicle 102 with respect the environment 104, and, more specifically, with respect to itself within the environment 104. In some embodiments, the localization data 224 may also include, for example, GPS data and/or image-based localization techniques (e.g., simultaneous localization and mapping, or SLAM). For example, the perception module 202 may determine the pose (e.g., position and orientation) of the vehicle 102 or the poses of the sensors 208, 210, and 212 of the vehicle 102 within the environment 104. In certain embodiments (although not illustrated), the perception module 202 may include one or more agent modelers (e.g., object detectors, object classifiers, or ML models trained to derive information from the LiDAR sensors 208, camera sensors 210, and radar sensors 212) to detect and/or classify agents 108 present in the environment 104 of the vehicle 102 (e.g., other vehicles 102, pedestrians, bicyclists, wildlife, vegetation, or any of various other moving and/or stationary objects). The perception module 202 may also determine various characteristics of the agents 108. For example, perception module 202 may track the velocities, moving directions, accelerations, trajectories, relative distances, or relative positions of these agents 108.

In certain embodiments, as further depicted in FIG. 2, the perception module 202 may also leverage information from the semantic mapping data 226. In one embodiment, the semantic mapping data 226 may include, for example, a 3D high-definition map. In certain embodiments, the semantic mapping data 226 (e.g., 3D high-definition map) may include, for example, a precise 3D model of the environment 104, including buildings, curbs, street signs, traffic lights, vegetation, and any of various other stationary objects that may be perceived within the environment 104. In certain embodiments, based on GPS data and/or image localization data 224, the perception module 202 may determine the pose (e.g., position and orientation) of the vehicle 102 or the poses of the sensors of the vehicle 102 within the semantic mapping data 226 (e.g., 3D high-definition map). The pose information, in turn, may be used by the perception module 202 to query the semantic mapping data 226 (e.g., 3D high-definition map) and determine, for example, which agents 108 are expected to be in the environment 104.

In certain embodiments, the perception module 202 may utilize the data collected from the LiDAR sensors 208, camera sensors 210, and radar sensors 212 and the calibration data 220, localization data 224, and semantic mapping data 226 to generate a 2D and 3D representations of the contextual environment 104 of the vehicle 102. For example, the 2D and 3D representations of the external environment 104 may include 2D and 3D representations of agents 108 (e.g., vehicles 102, pedestrians, bicyclists, wildlife, vegetation, or any of various other moving and/or stationary objects). The contextual representations may be limited to a maximum range of the sensor array (e.g., 50 meters, 100 meters, or 200 meters) or may be supplemented by information obtained from other sensors in the environment 104, semantic information known about an area, and/or any other relevant information regardless of the range of the sensor array. In some embodiments, the 2D and 3D representations of the contextual environment 104 may include, for example, information about the agents 108 or other objects within the environment 104 that may be surrounding the vehicle 102, as well as semantic information about the traffic lanes, traffic rules, traffic signs, time of day, weather, and/or any other suitable information. In certain embodiments, the 2D and 3D contextual environment 104 may be represented in any suitable manner. For example, the 2D and 3D contextual representation may be encoded as a vector or matrix of numerical values, with each value in the vector/matrix corresponding to a predetermined category of information.

In certain embodiments, as further depicted in FIG. 2, the perception module 200 may include an object-detection and classification framework 220 that may be trained offline and deployed to the perception module 200 to generate improved perception outputs 228. Indeed, as will described in further detail below, the object-detection and classification framework 220 may include software, hardware, or a combination thereof that may be utilized for receiving 3D datasets (e.g., 3D point clouds, 3D BEV presentations) and 2D datasets (e.g., 2D RGB images), and utilizing those datasets for training the 2D and 3D joint object-detection pipelines 214, 216 utilized to estimate 2D and 3D bounding boxes for each agent 108 or other object of interest within a 2D image, a 3D point cloud, or a 3D BEV presentation utilizing only partial annotation data (e.g., 3D annotation data).

For example, in certain embodiments, the object-detection and classification framework 220 may include hardware, such as a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), and/or other processing device(s) that may be suitable for processing various vehicle 102 data and/or environment 104 data and generating one or more perception outputs 228. Similarly, in certain embodiments, the object-detection and classification framework 220 may also include one or more software algorithms and/or one or more software models (e.g., instructions running/executing on one or more processing devices), such as machine learning ML) algorithms (e.g., deep learning algorithms, supervised learning algorithms, unsupervised learning algorithms), expert systems, computer-based vision algorithms, and so forth that may be suitable for learning and inferring from the 2D and 3D data captured or received, for example, via the LiDAR sensors 208, camera sensors 210, localization data 224, and/or semantic mapping data 226. As will be further appreciated with respect to FIGS. 3-5, in one embodiment, the object-detection and classification framework 220 may include a supervised learning framework that may be utilized for training the 2D and 3D joint object-detection pipelines utilized to estimate 2D and 3D bounding boxes for each agent 108 of interest within a 2D image, a 3D point cloud, or a 3D BEV presentation utilizing only partial annotation data (e.g., 3D annotation data).

Figure 3:
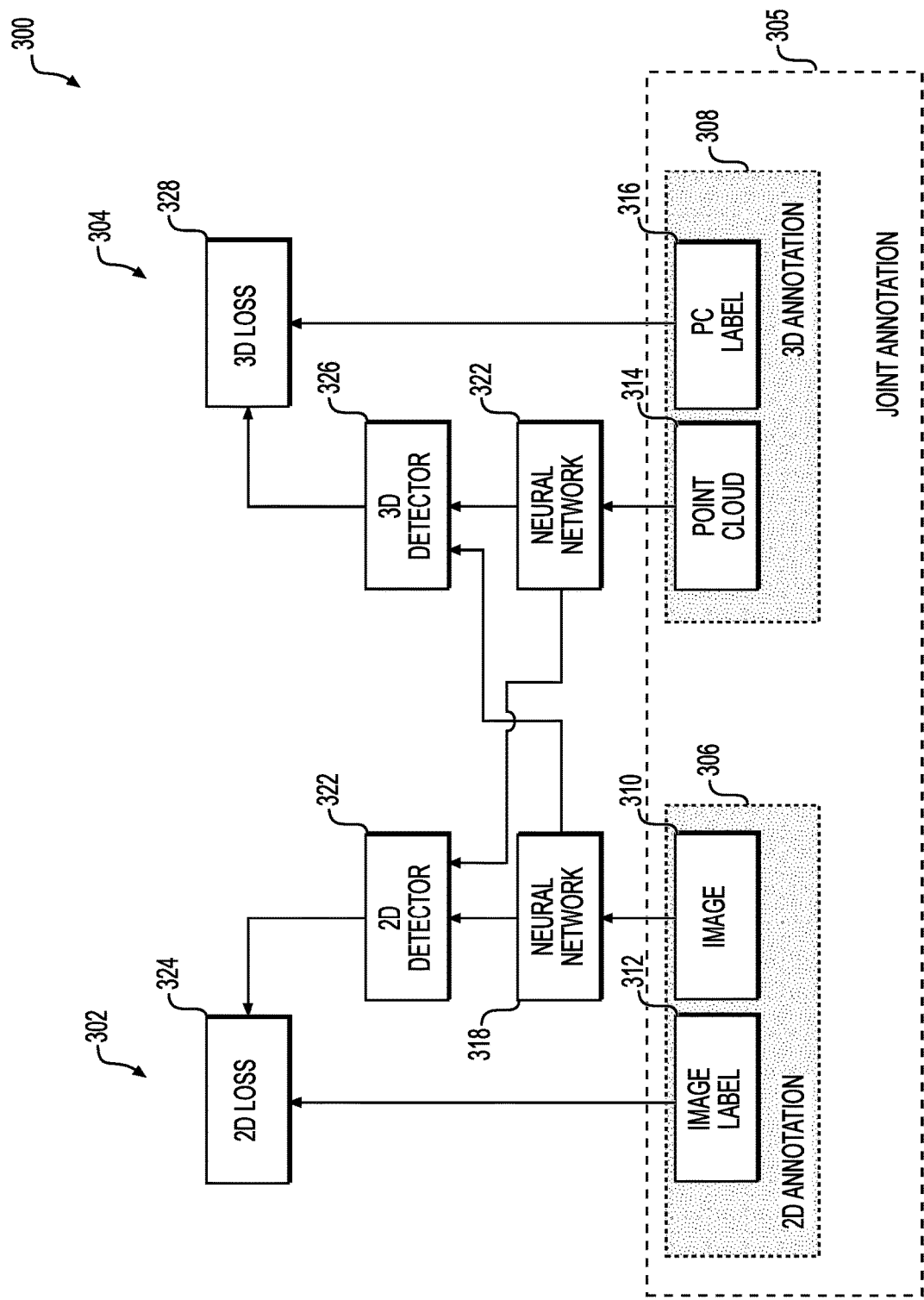
FIG. 3 is a workflow diagram for training 2D and 3D joint object-detection pipelines utilizing a joint annotation training sample.

FIG. 3 illustrates a workflow diagram 300 for training 2D and 3D joint object-detection pipelines 302 and 304 utilizing a joint annotation training sample 305, in accordance with the presently disclosed embodiments. In certain embodiments, the joint 2D object-detection pipeline 302 and 3D object-detection pipeline 304 may be provided, for example, to leverage both 2D RGB images and 3D point cloud data to detect objects of interest in both 2D and 3D. For example, in certain embodiments, a 2D-detection model of the 2D object-detection pipeline 302 may, in addition to a 2D RGB image, also utilize corresponding a 3D point cloud or 3D BEV representation to improve a capability of the 2D-detection model to detect agents 108 or other objects in a 2D RGB image. Likewise, in certain embodiments, a 3D detection-model of the 3D object-detection pipeline 304 may, in addition to a 3D point cloud or 3D BEV representation, also utilize corresponding a 2D RGB image to improve a capability of the 3D-detection model to detect agents 108 or other objects in a 3D point cloud or 3D BEV representation.

In certain embodiments, the joint 2D object-detection pipeline 302 and 3D object-detection pipeline 304 may be each trained based on a 2D annotation dataset 306 and 3D annotation dataset 308 (e.g., the ground truth of where a 2D bounding box appears in the 2D image and the ground truth of where a 3D bounding box appears in the 3D point cloud or 3D BEV representation), respectively. Further, while the joint 2D object-detection pipeline 302 and 3D object-detection pipeline 304 as depicted in FIG. 3 may be discussed individually and/or in conjunction for the purposes of illustration, it should be appreciated that the joint 2D object-detection pipeline 302 and 3D object-detection pipeline 304 may be each trained based on the respective 2D annotation and 3D annotation datasets 306 and 308 of the joint annotation training sample 305 in parallel (e.g., concurrently) or serially (e.g., successively).

For example, in certain embodiments, as depicted by FIG. 3, the 2D annotation dataset 306 may include a 2D image 310 (e.g., 2D RGB image) and an image class label 312 (e.g., ground truth 2D bounding box). Similarly, the 3D annotation dataset 308 may include a 3D point cloud 314 (or 3D BEV representation) and a 3D point cloud class label 316 (e.g., ground truth 3D bounding box, such as a 3D cuboid). In certain embodiments, the 2D object-detection pipeline 302 may receive the 2D image 310 (e.g., 2D RGB image) as an input to a neural network 318. Concurrently or near concurrently, the 3D object-detection pipeline 304 may receive the 3D point cloud 314 as an input to a neural network 320. In one embodiment, the neural network 318 and the neural network 320 may each include a convolutional neural network (CNN, ConvNet) that may be respectively utilized to extract features of one or more agents 108 or other objects of interest within the 2D image 310. In other embodiments, the neural network 318 and the neural network 320 may each include, for example, any of various artificial neural networks (ANNs), such as a multilayer perceptron (MLP), an autoencoder (AE), a recurrent neural network (RNN), a long short term memory (LSTM) network, a grated recurrent unit (GRU), a restricted Boltzmann Machine (RBM), a deep belief network (DBN), a bidirectional recurrent deep neural network (BRDNN), a generative adversarial network (GAN), a deep Q-network (DQN), a neural autoregressive distribution estimation (NADE) network, an adversarial network (AN), an attentional model (AM), a deep reinforcement learning model, or other similar neural network that may be suitable for extracting features of the one or more agents 108 or other objects of interest within the 2D image 310.

In certain embodiments, as further depicted in FIG. 3, the neural network 318 may extract feature vectors encoding features of one or more agents 108 in the 2D image 310 and provide the feature vectors to a 2D object-detector 322. In some embodiments, the 2D object detector 322 may include, for example, an ML model or neural network that may be similar to the neural network 318, for example. In certain embodiments, as further depicted by the FIG. 3, in addition to receiving the feature vectors encoding features of one or more agents 108 (e.g., vehicles 102, pedestrians, bicyclists, wildlife, vegetation, or any of various other moving and/or stationary objects) from the neural network 318, the 2D object detector 322 may also receive feature vectors encoding features of the corresponding one or more agents 108 (e.g., vehicles 102, pedestrians, bicyclists, wildlife, vegetation, or any of various other moving and/or stationary objects) in the 3D point cloud 314 from a neural network 320. In one embodiment, the neural network 320 may include a convolutional neural network (e.g., CNN, ConvNet). In other embodiments, the neural network 320 may include, for example, an RNN, a LSTM network, a RBM, a DBN, a BRDNN, a GAN, a DQN, or similar neural network that may be suitable for extracting features of the corresponding one or more agents 108 or other objects of interest within the 3D point cloud 314.

In certain embodiments, based on the 2D feature vectors received from the neural network 318 and the 3D feature vectors received from the neural network 320, the 2D object detector 322 may the generate an estimation (e.g., a prediction) of a 2D bounding box within the 2D image 310 (e.g., RGB image), indicating, for example, a detection and classification of the one or more agents 108 in 2D space. For example, in one embodiment, the 2D object detector 322 may generate a 2D bounding box as a proposal within the 2D image 310 to be compared to a ground truth 2D bounding box for the one or more agents 108 to determine whether the estimated 2D bounding box generated by the 2D object detector 322 is accurate. Specifically, the 2D object detector 322 may output the estimated 2D bounding box to a 2D loss module 324.

Based on the input of the estimated 2D bounding box and an input of the image class label 312 (e.g., 2D ground truth annotation), the 2D loss module 324 may then compare the estimated 2D bounding box generated by the 2D object detector 322 to the image class label 312 (e.g., 2D ground truth annotation) associated with the 2D image 310. In certain embodiments, the 2D loss module 324 may generate, for example, a regression loss (e.g., mean square error (MSE) loss, mean absolute error (MAE) loss) as the result of the comparison between the estimated 2D bounding box and an input of the image class label 312 (e.g., 2D ground truth annotation). For example, in some embodiments, the 2D regression loss may be then utilized in backpropagation to update parameters of the 2D object detector 322, the neural network 318, and the neural network 320.

In certain embodiments, as previously noted, the neural network 320 may extract feature vectors encoding features of the corresponding one or more agents 108 (e.g., vehicles 102, pedestrians, bicyclists, wildlife, vegetation, or any of various other moving and/or stationary objects) in the 3D point cloud 314 and provide the feature vectors to a 3D object-detector 326. In some embodiments, the 3D object detector 326 may include, for example, an ML model or neural network that may be similar to the neural network 320, for example. In certain embodiments, as further depicted by the FIG. 3, in addition to receiving the feature vectors encoding features of the corresponding one or more agents 108 from the neural network 320, the 3D object detector 326 may also receive the feature vectors encoding features of the one or more agents 108 in the 2D image 310 (e.g., RGB image) from the neural network 318.

In certain embodiments, based on the 3D feature vectors received from the neural network 320 and the 2D feature vectors received from the neural network 318, the 3D object detector 326 may then generate an estimation (e.g., a prediction) of a 3D bounding box (e.g., cuboid) within the 3D point cloud 314 (or 3D BEV representation), indicating, for example, a detection and classification of the corresponding one or more agents 108 in 3D space. For example, in one embodiment, the 3D object detector 326 may generate a 3D bounding box as a proposal within the 3D point cloud 314 to be compared (e.g., position-wise, orientation-wise, size-wise, and so forth) to a ground truth 3D bounding box (e.g., ground truth cuboid) for the corresponding one or more agents 108 to determine whether the estimated 3D bounding box generated by the 3D object detector 326 is accurate. Particularly, the 3D object detector 326 may output the estimated 3D bounding box (e.g., cuboid) to a 3D loss module 328.

Based on the input of the estimated 3D bounding box (e.g., cuboid) and an input of the point cloud class label 316 (e.g., 3D ground truth annotation), the 3D loss module 328 may then compare (e.g., position-wise, orientation-wise, size-wise, and so forth) the estimated 3D bounding box (e.g., cuboid) generated by the 3D object detector 326 to the point cloud class label 316 (e.g., 3D ground truth annotation) associated with the 3D point cloud 314. In certain embodiments, the 3D loss module 326 may generate, for example, a regression loss (e.g., MSE loss, MAE loss) as the result of the comparison between the estimated 3D bounding box (e.g., cuboid) and an input of the point cloud class label 316 (e.g., 3D ground truth annotation). For example, in some embodiments, the 3D regression loss may be then utilized in backpropagation to update parameters of the 3D object detector 326, the neural network 318, and the neural network 320.

Thus, as the forgoing illustrates, the joint 2D object-detection pipeline 302 and 3D object-detection pipeline 304 may be provided and trained, for example, to leverage both 2D images 310 (e.g., RGB images) and 3D point cloud 314 to detect objects of interest in both 2D and 3D spaces. Specifically, as depicted by FIG. 3, when a joint annotation training sample 305 includes both a 2D annotation dataset 306 and a 3D annotation dataset 308. However, in some embodiments, providing a joint human annotation training sample 305 that includes both a 2D annotation dataset 306 and a 3D annotation dataset 308 in order to accurately train the respective 2D and 3D joint object-detection pipelines 302 and 304 may be costly, cumbersome, and potentially impracticable, especially when scaled, for example, for all of the possible agents 108 and environments 104 in which the vehicle 102 may encounter. That is, without the presently disclosed techniques, a particular training sample for training each of the 2D object-detection pipeline 302 and the 3D joint object-detection pipeline 304 would otherwise have to include both 2D and 3D annotation datasets 306 and 308 to properly train the respective 2D and 3D object-detection pipelines 306 and 308. It may be thus useful to provide techniques to train each of the 2D object-detection pipeline 302 and the 3D joint object-detection pipeline 304 based on partial annotation training datasets, for example, such that even for a particular training sample including only the 3D annotation dataset 308, for example, the 3D annotation dataset 308 alone may be utilized as the ground truth data to train each of the 2D object-detection pipeline 302 and the 3D joint object-detection pipeline 304.

Accordingly, the present embodiments include an object detection and classification framework 220 for training offline the 2D and 3D joint object-detection pipelines 302 and 304 utilized to estimate respective 2D bounding boxes and 3D bounding boxes for each agent 108 or other object of interest within a 2D image 310 (e.g., RGB image), a 3D point cloud, or a 3D BEV representation utilizing only partial annotation data (e.g., 3D annotation dataset 308). That is, even for a particular training sample including only a 3D annotation dataset 308, the 3D annotation dataset 308 alone may be utilized as the ground truth data to train each of the 2D object-detection pipeline 302 and the 3D object-detection pipeline 304. Indeed, in certain embodiments, while a given training sample may include a 2D image 310 (e.g., RGB image) and a corresponding 3D point cloud 314, because—in at least some embodiments—one or more training samples may include only 3D ground truth data for 3D object detection and not 2D ground truth data for 2D object detection, the present techniques allow both the 2D object-detection pipeline 302 and the 3D object-detection pipeline 304 to nevertheless be trained based only on the 3D ground truth data for 3D detection.

For example, as will be further appreciated below with respect to FIGS. 4A, 4B, and 5, the object detection and classification framework may access a training sample including an image of a scene, depth measurements of the scene, and a predetermined 3D position of an object in the scene. The object detection and classification framework may then train 1) a 2D-detection model for detecting 2D positions of objects and 2) 3D-detection model for detecting 3D positions of objects based on the depth measurements of the scene and the predetermined 3D position of the object. For example, in certain embodiments, training the 2D-detection model for detecting 2D positions of objects may include generating an estimated 2D position of the object within the image by processing the image using the 2D-detection model. In certain embodiments, generating the estimated 2D position of the object may include determining, by a 2D pipeline neural network of the 2D-detection model, a 2D set of feature vectors from the image of the scene. In some embodiments, the 2D set of feature vectors may correspond to the object in the image of the scene. In some embodiments, a 2D detector of the 2D-detection model may then generate the estimated 2D position of the object in the image of the scene based on the 2D set of feature vectors received from the 2D pipeline neural network and a 3D set of feature vectors received from a 3D pipeline neural network of the 3D-detection model. For example, the 3D set of feature vectors may correspond to the object in the depth measurements of the scene.

In certain embodiments, the object detection and classification framework may then include determining a subset of the depth measurements of the scene that correspond to the object based on the estimated 2D position of the object within the image and a viewpoint from which the image is captured. For example, in some embodiments, determining the subset of the depth measurements that correspond to the object may include utilizing a point-based detector of the 2D-detection model to generate a viewing frustum based on the estimated 2D position of the object, a pose associated with a sensor that captured the image of the scene, and the depth measurements of the scene. In certain embodiments, the object detection and classification framework may then generate an estimated 3D position of the object based on the subset of the depth measurements. For example, in some embodiments, generating the estimated 3D position of the object may include utilizing the point-based detector of the 2D-detection model to determine whether one or more of the depth measurements lying within the viewing frustum corresponds to the estimated 2D position of the object.

In certain embodiments, in response to determining that the one or more of the depth measurements lying within the viewing frustum corresponds to the estimated 2D position of the object, the point-based detector of the 2D-detection model may then generate the estimated 3D position for the one or more depth measurements. In certain embodiments, the object detection and classification framework may then update the 2D-detection model based on a comparison between the estimated 3D position of the object and the predetermined 3D position of the object. For example, in some embodiments, updating the 2D-detection model may include updating one or more parameters of the 2D detector of the 2D-detection model, the 2D pipeline neural network, and the 3D pipeline neural network based on the results of the comparison between the estimated 3D position of the object and the predetermined 3D position of the object.

In certain embodiments, as previously noted, either in serially or in parallel, the object detection and classification framework may then train the 3D-detection model for detecting 3D positions of objects based on the depth measurements of the scene and the predetermined 3D position of the object. For example, in certain embodiments, training the 3D-detection model for detecting 3D positions of objects may include generating an estimated 3D position of the object by processing the depth measurements of the scene using the 3D-detection model. For example, in some embodiments, generating the estimated 3D position of the object may include determining, by the 3D pipeline neural network, the 3D set of feature vectors from the depth measurements of the scene. In some embodiments, the 3D set of feature vectors may correspond to the object in the depth measurements of the scene. In certain embodiments, a 3D detector of the 3D-detection model may then generate the estimated 3D position of the object in the depth measurements of the scene based on the 3D set of feature vectors received from the 3D pipeline neural network and the 2D set of feature vectors received from the 2D pipeline neural network.

In certain embodiments, the object detection and classification framework may then update the 3D-detection model based on a comparison between the estimated 3D position of the object and the predetermined 3D position of the object. For example, in some embodiments, updating the 3D-detection model may include updating one or more parameters of the 3D detector, the 3D pipeline neural network, and the 2D neural network based on the results of the comparison between the estimated 3D position of the object and the predetermined 3D position of the object. In this way, the present techniques may be provided to train each of the 2D object-detection pipeline and the 3D joint object-detection pipeline based on partial annotation training data, such that even for a particular training sample including only 3D annotation data, the 3D annotation data alone may be utilized as the ground truth data to train each of the 2D object-detection pipeline and the 3D joint object-detection pipeline. That is, even for a particular training sample including only 3D annotation data, the 3D annotation data alone may be utilized as the ground truth data to train each of the 2D object-detection pipeline and the 3D joint object-detection pipeline. In sum, the present techniques may not only leverage both 2D images (e.g., RGB images) and 3D point clouds (or 3D BEV representations) to improve the precision and recall of autonomous or semi-autonomous vehicle object detection and classification, but may also engender such improvements to the precision and recall in object detection and classification by training the 2D object-detection pipeline and the 3D joint object-detection pipeline based only a partial annotation dataset.

Figure 4A:
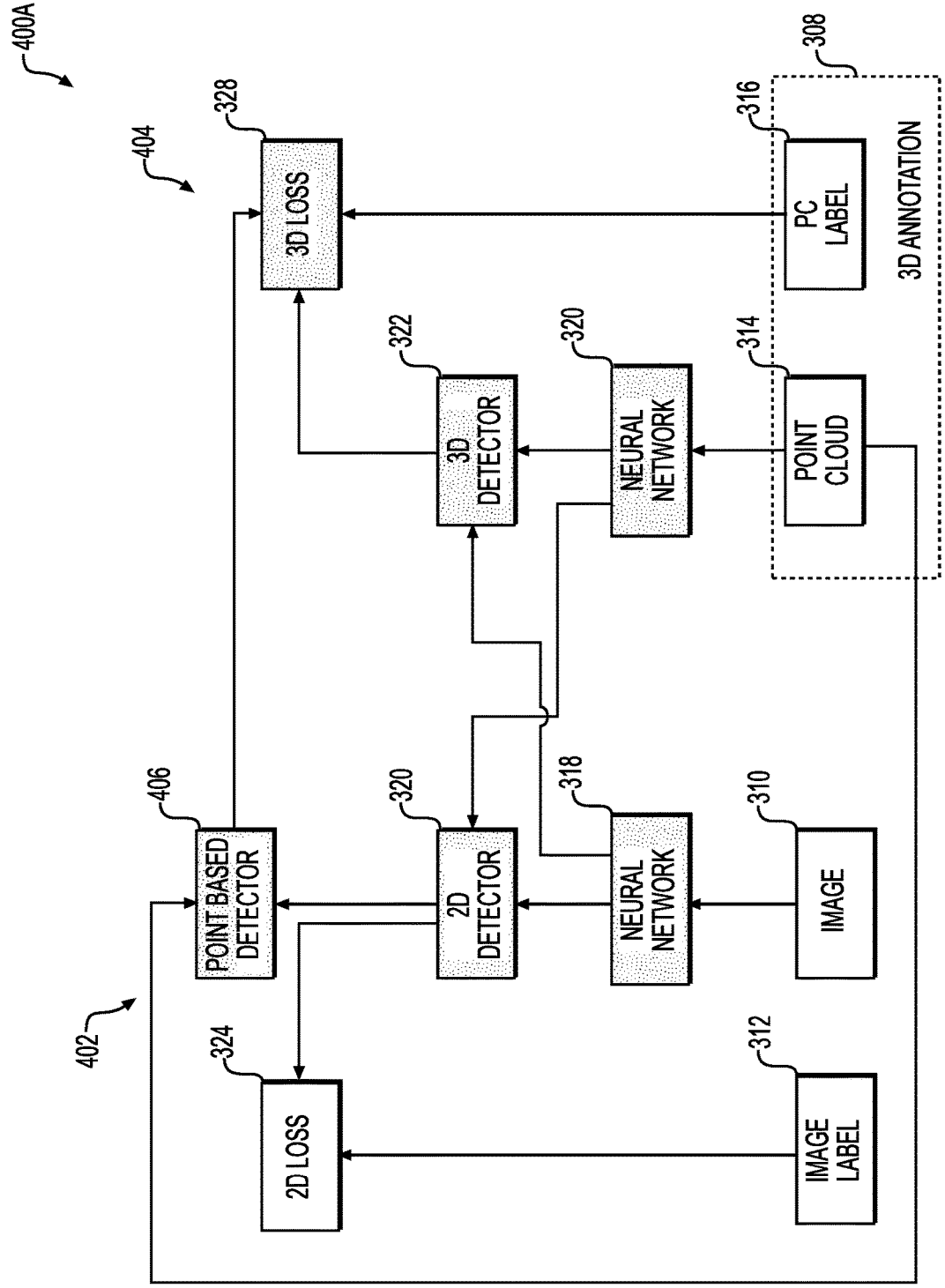
FIG. 4A is an example workflow diagram for training 2D and 3D joint object-detection pipelines utilizing only 3D partial annotation data.

FIG. 4A illustrates an example workflow diagram 400A for training 2D and 3D joint object-detection pipelines 402 and 404 utilizing partial annotation data (e.g., 3D annotation data), in accordance with the presently disclosed embodiments. In certain embodiments, as previously noted, the joint 2D object-detection pipeline 402 and 3D object-detection pipeline 404 may be provided, for example, to leverage both the 2D images (e.g., RGB images) and 3D point cloud 314 to detect agents 108 of interest in both 2D and 3D space. In certain embodiments, the joint 2D object-detection pipeline 402 and the 3D object-detection pipeline 404 may be each trained based on the 3D annotation dataset 308 (e.g., the ground truth of where a 3D bounding box appears in the 3D point cloud 314). As also previously noted above with respect to FIG. 3, while the joint 2D object-detection pipeline 402 and 3D object-detection pipeline 404 as depicted in FIG. 4A may be discussed individually and/or in conjunction for the purposes of illustration, it should be appreciated that the joint 2D object-detection pipeline 402 and 3D object-detection pipeline 404 may be each trained based on the 3D annotation dataset 308 in parallel (e.g., concurrently) or serially (e.g., successively).

For example, in certain embodiments, as depicted by FIG. 4A, the 3D annotation dataset 308 may include a 3D point cloud 314 (or 3D BEV representation) and a 3D point cloud class label 316 (e.g., ground truth 3D bounding box, such as a labeled 3D cuboid). In certain embodiments, the 3D object-detection pipeline 404 may receive the 3D point cloud 314 as an input to the neural network 320 that may be utilized to extract features of one or more agents 108 or other objects of interest within the 3D point cloud 314. Concurrently or near concurrently, the 2D object-detection pipeline 402 may receive the 2D image 310 as an input to the neural network 318. In certain embodiments, as further depicted in FIG. 4A, the neural network 320 may extract feature vectors encoding features of one or more agents 108 of interest in the 3D point cloud 314 and provide the feature vectors to the 2D object-detector 322 and the 3D object-detector 326. In certain embodiments, in addition to receiving the feature vectors encoding features of one or more agents 108 (e.g., vehicles 102, pedestrians, bicyclists, wildlife, vegetation, or any of various other moving and/or stationary objects) of interest from the neural network 320, the 2D object detector 322 may also receive feature vectors encoding features of the corresponding one or more agents 108 (e.g., vehicles 102, pedestrians, bicyclists, wildlife, vegetation, or any of various other moving and/or stationary objects) of interest in the 2D image 310 from the neural network 318.

In certain embodiments, based on the 2D feature vectors received from the neural network 318 and the 3D feature vectors received from the neural network 320, the 2D object detector 322 may the generate an estimation (e.g., a prediction) of a 2D bounding box within the 2D image 310 (e.g., RGB image), indicating, for example, a detection and classification of the one or more agents 108 of interest in 2D space. For example, in one embodiment, the 2D object detector 322 may generate a 2D bounding box as a proposal (e.g., based in part on the 2D image 310 and the 3D point cloud 314) within the 2D image 310 to be extruded to a 3D viewing frustum or other similar 3D geometry. The proposed 2D bounding box and the 3D viewing frustum may be then utilized to estimate a 3D bounding box (e.g., cuboid) for an apples-to-apples comparison (e.g., position-wise, orientation-wise, size-wise, and so forth) to a ground truth 3D bounding box (e.g., the point cloud class label 316) for the one or more agents 108 of interest to determine whether the estimated 2D bounding box generated by the 2D object detector 322 is accurate. That is, the 3D annotation dataset 308 alone may be utilized as the ground truth data to train each of the 2D object-detection pipeline 402 and the 3D joint object-detection pipeline 404. Particularly, in certain embodiments, the 2D object detector 322 may output the estimated 2D bounding box to a point based detector 406, which may include one or more convolutional neural networks (e.g., CNN, ConvNet) or other similar neural network that may be utilized to generate a 3D viewing frustum based on the 2D bounding box (e.g., 2D proposal of a position of a particular agent 108 within the 2D image 310), a pose associated with the camera sensor 210 that captured the 2D image 310, and the 3D point cloud 314 as also received by the point based detector 406.

In certain embodiments, the point based detector 406 may then generate an estimated 3D bounding box (e.g., cuboid) within the 3D point cloud 314 corresponding to the generated 3D viewing frustum and the pose associated with the camera sensor 210 that captured the 2D image 310. For example, in certain embodiments, the point based detector 406 may generate the estimated 3D bounding box (e.g., cuboid) within the 3D point cloud 314 by initially determining whether each 3D data point (e.g., x, y, z) lying within the generated 3D viewing frustum (e.g., lying within one or more planes of the generated 3D viewing frustum) corresponds to the particular one or more agents 108 of interest within the 2D image 310. For example, in some embodiments, the point based detector 406 may detect features of each of the 3D data points lying within the generated 3D viewing frustum and classify, based on the detected features of the 3D data points, each of the 3D data points lying within the generated 3D viewing frustum as either corresponding to the particular one or more agents 108 of interest or not corresponding to the particular one or more agents 108 of interest within the 2D image 310. In certain embodiments, the detected features of the 3D data points may include, for example, a property, a density, a unique value, an intensity, or other similar feature of each of the 3D data points lying within the generated 3D viewing frustum that may indicate the 3D data point as corresponding the particular one or more agents 108 of interest.

In certain embodiments, subsequent to classifying the set of the 3D data points lying within the generated 3D viewing frustum (e.g., within one or more planes of the generated 3D viewing frustum) that corresponds to the particular one or more agents 108 of interest, the point based detector 406 may then generate an estimated 3D bounding box (e.g., cuboid) that encompasses (e.g., perfectly or near perfectly) the entire set of the 3D data points lying within the generated 3D viewing frustum (e.g., lying within one or more planes of the generated 3D viewing frustum) that corresponds to the particular one or more agents 108 of interest within the 2D image 310. In certain embodiments, the point based detector 406 may then provide the estimated 3D bounding box (e.g., estimated cuboid) to the 3D loss module 328. Based on the input of the estimated 3D bounding box (e.g., estimated cuboid) received from the point based detector 406 and an input of the point cloud class label 316 (e.g., 3D ground truth annotation), the 3D loss module 328 may then compare the estimated 3D bounding box (e.g., estimated cuboid) generated by the point based detector 406 to the point class label 316 (e.g., 3D ground truth annotation) associated with the 3D point cloud 314.

In certain embodiments, the 3D loss module 328 may generate, for example, a regression loss (e.g., MSE loss, MAE loss) as the result of the comparison between the estimated 3D bounding box (e.g., estimated cuboid) and the input of the point cloud class label 316 (e.g., 3D ground truth annotation). For example, in some embodiments, the 3D regression loss may be then utilized in backpropagation to update parameters of the 2D object detector 322, the neural network 318, and the neural network 320. Thus, by utilizing the point based detector 406 to extrude the estimated 2D bounding box to a 3D viewing frustum and estimating a 3D bounding box (e.g., cuboid) based thereon, an apples-to-apples comparison to a ground truth 3D bounding box for the particular one or more agents 108 of interest may be performed to determine whether the estimated 2D bounding box generated by the 2D object detector 322 is accurate. In this way, 3D annotation data alone may be utilized as the ground truth data to train the 2D object-detection pipeline 402.

In certain embodiments, as previously noted, the neural network 320 may extract feature vectors encoding features of the corresponding one or more agents 108 (e.g., vehicles 102, pedestrians, bicyclists, wildlife, vegetation, or any of various other moving and/or stationary objects) in the 3D point cloud 314 and provide the feature vectors to a 3D object-detector 326. In certain embodiments, as further depicted by the FIG. 4A, in addition to receiving the feature vectors encoding features of the corresponding one or more agents 108 from the neural network 320, the 3D object detector 326 may also receive the feature vectors encoding features of the one or more agents 108 in the 2D image 310 (e.g., RGB image) from the neural network 318. In certain embodiments, based on the 3D feature vectors received from the neural network 320 and the 2D feature vectors received from the neural network 318, the 3D object detector 326 may the generate an estimation (e.g., a prediction) of a 3D bounding box (e.g., cuboid) within the 3D point cloud 314 (or 3D BEV representation), indicating, for example, a detection and classification of the corresponding one or more agents 108 in 3D space. For example, in one embodiment, the 3D object detector 326 may generate a 3D bounding box as a proposal within the 3D point cloud 314 to be compared to the ground truth 3D bounding box (e.g., ground truth cuboid) for the corresponding one or more agents 108 to determine whether the estimated 3D bounding box generated by the 3D object detector 326 is accurate. Particularly, the 3D object detector 326 may output the estimated 3D bounding box (e.g., cuboid) to the 3D loss module 328.

Based on the input of the estimated 3D bounding box (e.g., cuboid) and an input of the point cloud class label 316 (e.g., 3D ground truth annotation), the 3D loss module 328 may then compare the estimated 3D bounding box (e.g., cuboid) generated by the 3D object detector 326 to the point cloud class label 316 (e.g., 3D ground truth annotation) associated with the 3D point cloud 314. In certain embodiments, the 3D loss module 326 may generate, for example, a regression loss (e.g., MSE loss, MAE loss) as the result of the comparison between the estimated 3D bounding box (e.g., cuboid) and an input of the point cloud class label 316 (e.g., 3D ground truth annotation). For example, in some embodiments, the 3D regression loss may be then utilized in backpropagation to update parameters of the 3D object detector 326, the neural network 318, and the neural network 320. The forgoing thus illustrates that 3D annotation data alone may be utilized as the ground truth data to train each of the 2D object-detection pipeline 402 and the 3D joint object-detection pipeline 404.

Figure 4B:
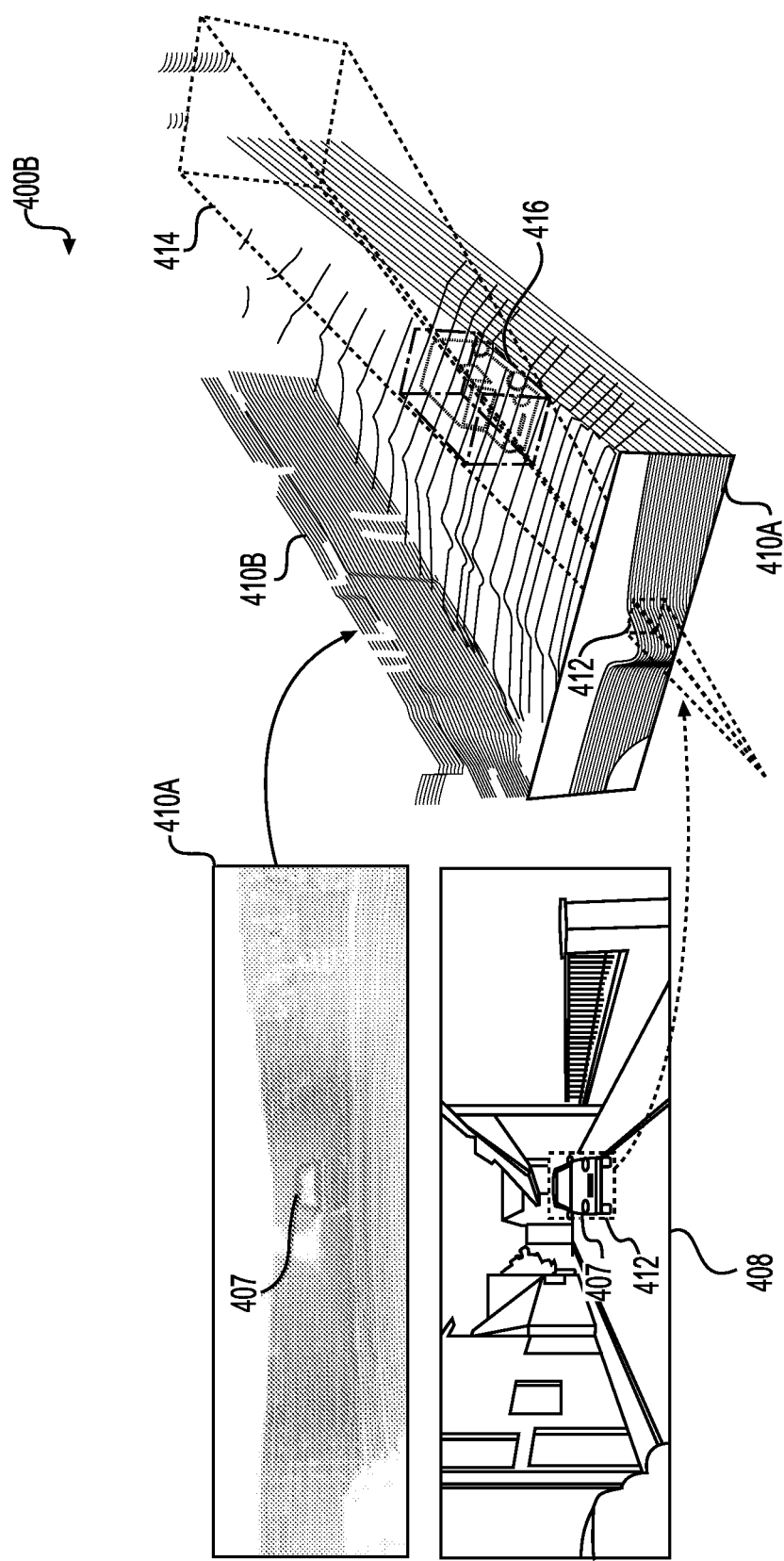
FIG. 4B is an example model of a 2D object-detection pipeline trained based only on 3D partial annotation data.

FIG. 4B is an illustrative training example 400B of the 2D object-detection pipeline 402 based on partial annotation data, in accordance with the presently disclosed embodiments. In certain embodiments, as previously noted above with respect to FIG. 4A, 2D feature vectors corresponding to a particular agent 407 of interest within a 2D image 408 and 3D feature vectors corresponding to the particular agent 407 within a 3D point cloud 410A may be extracted by respective 2D and 3D neural networks (e.g., neural networks 318 and 320). In certain embodiments, based on the 2D feature vectors and the 3D feature vectors, an estimation (e.g., a prediction) of a 2D bounding box 412 within the 2D image 408 may be generated. In one embodiment, the 2D bounding box 412 may indicate, for example, a detection and classification of the particular agent 407 in 2D space. As further depicted, in certain embodiments, the 2D bounding box 412 may be extruded to a 3D viewing frustum 414 or other similar 3D geometry, which may be utilized to estimate a 3D bounding box (e.g., cuboid) for an apples-to-apples comparison to a ground truth 3D bounding box (e.g., the point cloud class label 316) for the particular agent 407 to determine whether the estimated 2D bounding box 412 is accurate. In certain embodiments, the 3D viewing frustum 414 may be generated based on the estimated 2D bounding box 412 (e.g., 2D proposal of a position of the particular agent 407 within the 2D image 408), a pose associated with the camera sensor that captured the 2D image 408, and the 3D point cloud 410A.

In certain embodiments, as further depicted by FIG. 4B, an estimated 3D bounding box 416 (e.g., cuboid) within the within the 3D point cloud 410B may be generated based on the 3D viewing frustum 414 and the pose of the associated with the camera sensor 210 that captured the 2D image 408 (e.g., as). For example, in certain embodiments, the estimated 3D bounding box 416 (e.g., cuboid) within the 3D point cloud 410B by initially determining whether each 3D data point lying within the generated 3D viewing frustum 414 (e.g., lying within one or more planes of the generated 3D viewing frustum 414) corresponds to the particular agent 407 of interest within the 2D image 408 and the 3D point cloud 410B. For example, as previously noted above with respect to FIG. 4A, the point based detector 406 may detect features of each of the 3D data points lying within the generated 3D viewing frustum 414 and classify each of the 3D data points lying within the generated 3D viewing frustum 414 as either corresponding to the particular agent 407 of interest or not corresponding to the particular agent 407 of interest within the 2D image 408 and the 3D point cloud 410A.

In certain embodiments, subsequent to classifying the set of the 3D data points lying within the generated 3D viewing frustum (e.g., within one or more planes of the generated 3D viewing frustum 414) that corresponds to the particular agent 407 of interest, the estimated 3D bounding box 416 (e.g., cuboid) that encompasses (e.g., perfectly or near perfectly) the entire set of the 3D data points lying within the generated 3D viewing frustum 414 corresponding to the particular agent 407 of interest within the 2D image 408 and the 3D point cloud 410A may be generated. In certain embodiments, the estimated 3D bounding box 416 (e.g., estimated cuboid) may be then compared (e.g., position-wise, orientation-wise, size-wise, and so forth) to 3D ground truth annotation data associated with the 3D point cloud 410A. Thus, as again previously noted above with respect to FIG. 4A, the 3D annotation data alone may be utilized as the ground truth data to train the 2D object-detection pipeline 402.

Figure 5:
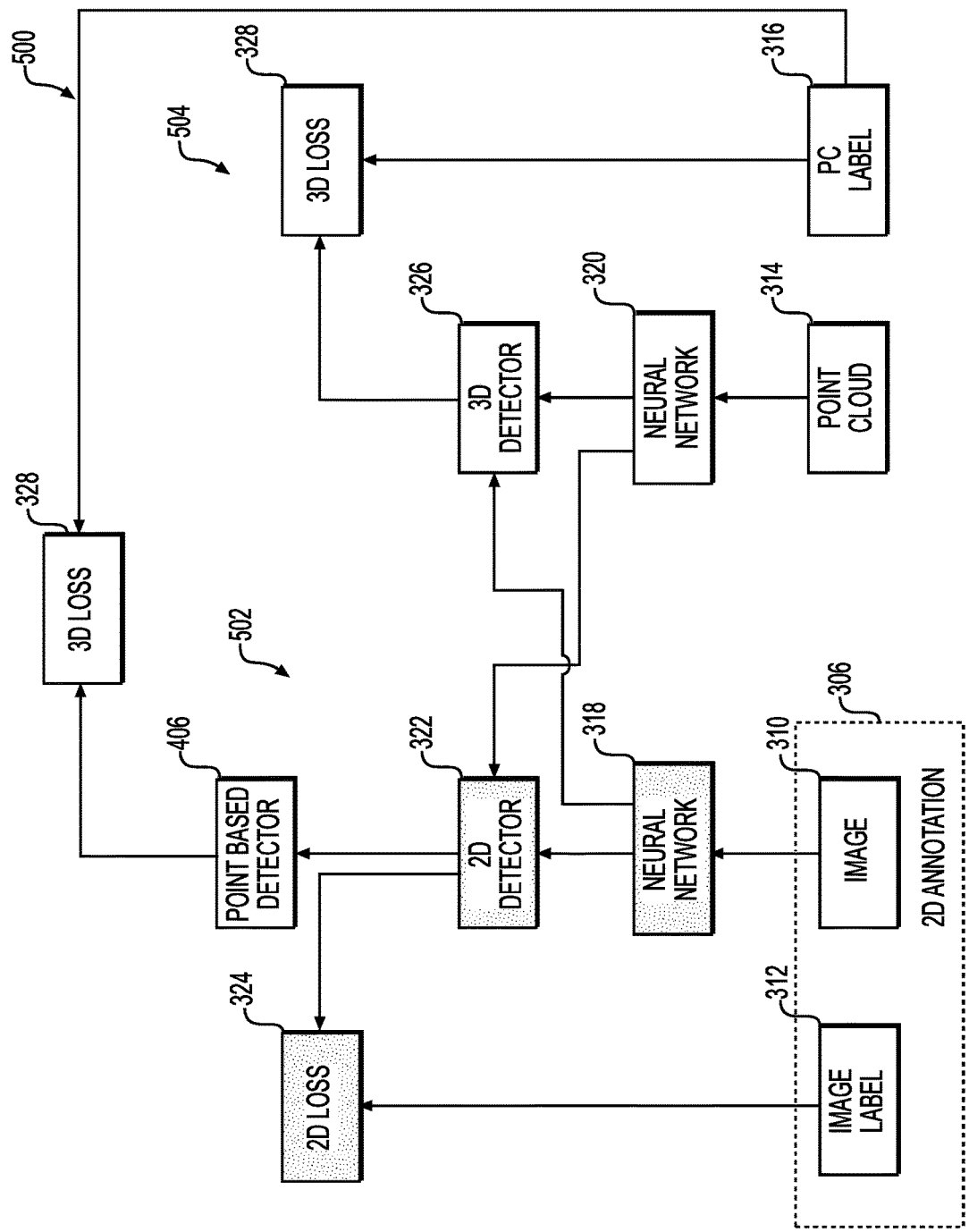
FIG. 5 is an example workflow diagram for training a 2D object-detection pipeline utilizing 2D partial annotation data.

FIG. 5 illustrates an example workflow diagram 500 for training a 2D object-detection pipeline 502 utilizing partial annotation data (e.g., 2D annotation data), in accordance with the presently disclosed embodiments. Specifically, FIG. 5 illustrates an example in which a given training sample includes only a 2D annotation dataset 306, which may be used to train only the 2D object-detection pipeline 502. In certain embodiments, as depicted by FIG. 5, the 2D annotation dataset 306 may include a 2D image 310 (e.g., 2D RGB image) and an image class label 312 (e.g., ground truth 2D bounding box). Likewise, the 3D annotation dataset 308 may include a 3D point cloud 314 (or 3D BEV representation) and a 3D point cloud class label 316 (e.g., ground truth 3D bounding box, such as a 3D cuboid). In certain embodiments, the 2D object-detection pipeline 502 may receive the 2D image 310 (e.g., 2D RGB image) as an input to the neural network 318, and the 3D object-detection pipeline 304 may receive the 3D point cloud 314 as an input to the neural network 320.

In certain embodiments, as further depicted in FIG. 5, the neural network 318 may extract feature vectors encoding features of one or more agents 108 in the 2D image 310 and provide the feature vectors to a 2D object-detector 322. In some embodiments, the 2D object detector 322 may include, for example, an ML model or neural network that may be similar to the neural network 318, for example. In certain embodiments, as further depicted by the FIG. 3, in addition to receiving the feature vectors encoding features of one or more agents 108 (e.g., vehicles 102, pedestrians, bicyclists, wildlife, vegetation, or any of various other moving and/or stationary objects) from the neural network 318, the 2D object detector 322 may also receive feature vectors encoding features of the corresponding one or more agents 108 (e.g., vehicles 102, pedestrians, bicyclists, wildlife, vegetation, or any of various other moving and/or stationary objects) in the 3D point cloud 314 from a neural network 320. In certain embodiments, based on the 2D feature vectors received from the neural network 318 and the 3D feature vectors received from the neural network 320, the 2D object detector 322 may the generate an estimation (e.g., a prediction) of a 2D bounding box within the 2D image 310 (e.g., RGB image), indicating, for example, a detection and classification of the one or more agents 108 in 2D space.

For example, in one embodiment, the 2D object detector 322 may generate a 2D bounding box as a proposal within the 2D image 310 to be compared to a ground truth 2D bounding box for the one or more agents 108 to determine whether the estimated 2D bounding box generated by the 2D object detector 322 is accurate. Specifically, the 2D object detector 322 may output the estimated 2D bounding box to a 2D loss module 324. Based on the input of the estimated 2D bounding box and an input of the image class label 312 (e.g., 2D ground truth annotation), the 2D loss module 324 may then compare the estimated 2D bounding box generated by the 2D object detector 322 to the image class label 312 (e.g., 2D ground truth annotation) associated with the 2D image 310. In certain embodiments, the 2D loss module 324 may generate, for example, a regression loss (e.g., MSE loss, MAE loss) as the result of the comparison between the estimated 2D bounding box and an input of the image class label 312 (e.g., 2D ground truth annotation). For example, in one embodiment, the 2D regression loss may be then utilized in backpropagation to update parameters of the 2D object detector 322, the neural network 318, and the neural network 320.

Figure 6:
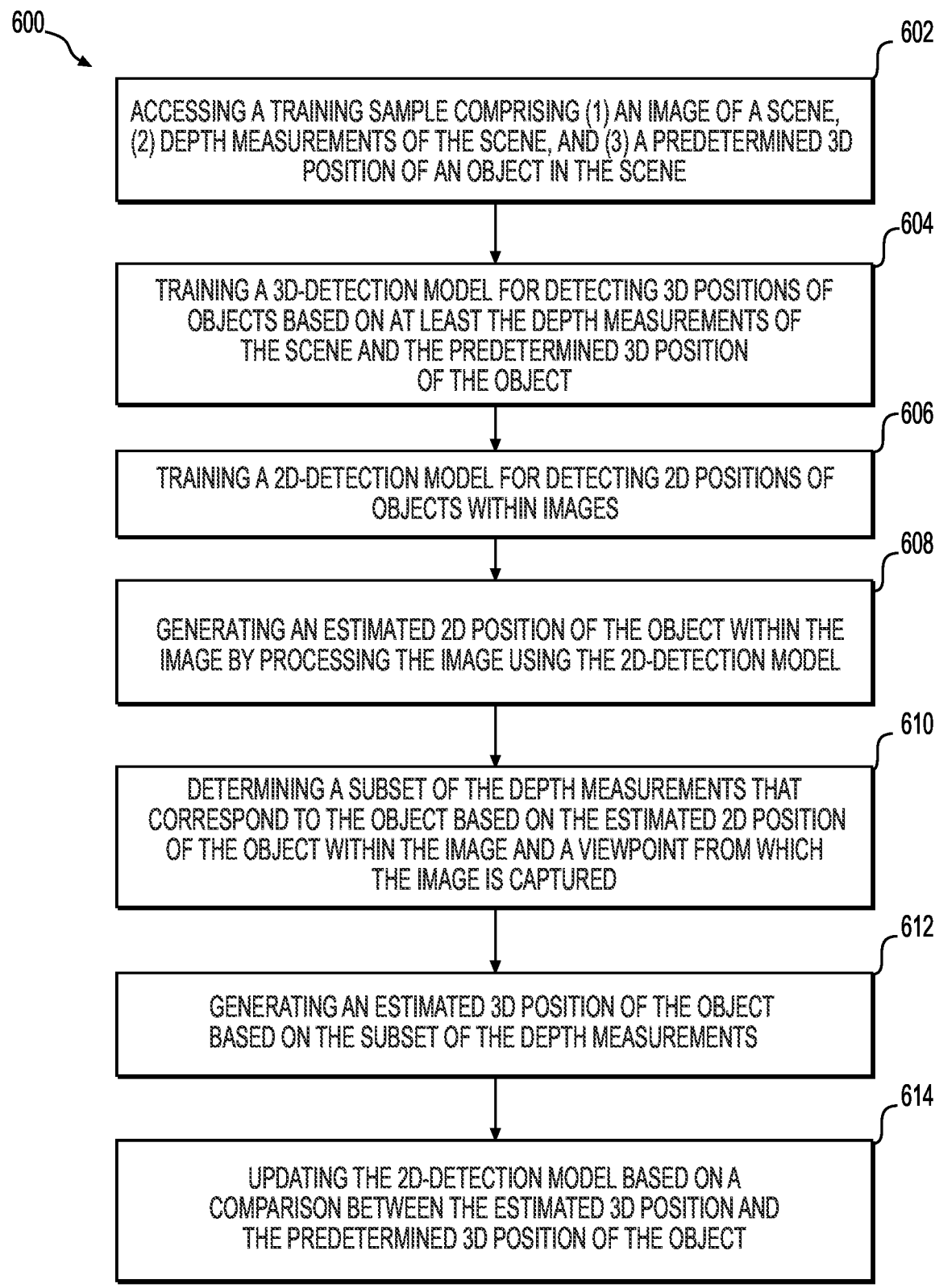
FIG. 6 illustrates a flow diagram of a method for training 2D and 3D joint object-detection pipelines utilizing only 3D partial annotation data.

FIG. 6 illustrates a flow diagram of a method 600 for training 2D and 3D joint object-detection pipelines utilized to estimate 2D and 3D bounding boxes for each object of interest within a 2D RGB image, a 3D point cloud, or a 3D BEV representation using 3D annotation data, in accordance with the presently disclosed techniques. The method 600 may be performed utilizing one or more processing devices (e.g., object detection and classification framework 220) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

The method 600 may begin at block 602 with one or more processing devices (e.g., object detection and classification framework 220) accessing a training sample including (1) an image of a scene, (2) depth measurements of the scene, and (3) a predetermined 3D position of an object in the scene. The method 600 may then continue at block 604 with one or more processing devices (e.g., object detection and classification framework 220) training a 3D-detection model for detecting 3D positions of objects based on at least the depth measurement of the scene and the predetermined 3D position of the object. The method 600 may then continue at block 606 with one or more processing devices (e.g., object detection and classification framework 220) training a 2D-detection model for detecting 2D positions of objects within images. In certain embodiments, training the 2D-detection model for detecting 2D positions of objects within images may be performed by blocks 608-614. Further, as delineated in greater detail above, while block 604 for training a 3D-detection model for detecting 3D positions of objects and block 606 for training a 2D-detection model for detecting 2D positions of objects as depicted in FIG. 6 may be discussed individually and/or in conjunction for the purposes of illustration, it should be appreciated that the 3D-detection model for detecting 3D positions of objects and the 2D-detection model for detecting 2D positions of objects may be each trained in parallel (e.g., concurrently) or serially (e.g., successively).

For example, the method 600 may continue at block 608 with one or more processing devices (e.g., object detection and classification framework 220) generating an estimated 2D position of the object within the image by processing the image using the 2D-detection model. The method 600 may then continue at block 610 with one or more processing devices (e.g., object detection and classification framework 220) determining a subset of the depth measurements that correspond to the object based on the estimated 2D position of the object within the image and a viewpoint from which the image is captured. The method 600 may then continue at block 612 with one or more processing devices (e.g., object detection and classification framework 220) generating an estimated 3D position of the object based on the subset of the depth measurements. The method 600 may then conclude at block 614 with one or more processing devices (e.g., object detection and classification framework 220) updating the 2D-detection model based on a comparison between the estimated 3D position of the object and the predetermined 3D position of the object.

Accordingly, as described by the method 600 of FIG. 6, the present techniques are directed toward an object detection and classification framework for training 2D and 3D joint object-detection pipelines utilized to estimate 2D and 3D bounding boxes for each object of interest within a 2D RGB image, a 3D point cloud, or a 3D BEV representation utilizing only partial annotation data. That is, even for a particular training sample including only 3D annotation data, the 3D annotation data alone may be utilized as the ground truth data to train each of the 2D object-detection pipeline and the 3D joint object-detection pipeline. Indeed, in certain embodiments, a training sample may include an 2D RGB image and a corresponding 3D point cloud, but, because—in some instances—one or more training samples may include only 3D ground truth data for 3D detection and not 2D ground truth data for 2D detection, the present techniques allow both the 3D object-detection and 2D object-detection pipelines to nevertheless be trained based only on the 3D ground truth data for 3D detection.

For example, in certain embodiments, the object detection and classification framework may access a training sample including an image of a scene, depth measurements of the scene, and a predetermined 3D position of an object in the scene. The object detection and classification framework may then train 1) a 2D-detection model for detecting 2D positions of objects and 2) 3D-detection model for detecting 3D positions of objects based on the depth measurements of the scene and the predetermined 3D position of the object. For example, in certain embodiments, training the 2D-detection model for detecting 2D positions of objects may include generating an estimated 2D position of the object within the image by processing the image using the 2D-detection model. In certain embodiments, generating the estimated 2D position of the object may include determining, by a 2D pipeline neural network of the 2D-detection model, a 2D set of feature vectors from the image of the scene. In some embodiments, the 2D set of feature vectors may correspond to the object in the image of the scene. In some embodiments, a 2D detector of the 2D-detection model may then generate the estimated 2D position of the object in the image of the scene based on the 2D set of feature vectors received from the 2D pipeline neural network and a 3D set of feature vectors received from a 3D pipeline neural network of the 3D-detection model. For example, the 3D set of feature vectors may correspond to the object in the depth measurements of the scene.

In certain embodiments, the object detection and classification framework may then include determining a subset of the depth measurements of the scene that correspond to the object based on the estimated 2D position of the object within the image and a viewpoint from which the image is captured. For example, in some embodiments, determining the subset of the depth measurements that correspond to the object may include utilizing a point-based detector of the 2D-detection model to generate a viewing frustum based on the estimated 2D position of the object, a pose associated with a sensor that captured the image of the scene, and the depth measurements of the scene. In certain embodiments, the object detection and classification framework may then generate an estimated 3D position of the object based on the subset of the depth measurements. For example, in some embodiments, generating the estimated 3D position of the object may include utilizing the point-based detector of the 2D-detection model to determine whether one or more of the depth measurements lying within the viewing frustum corresponds to the estimated 2D position of the object.

In certain embodiments, in response to determining that the one or more of the depth measurements lying within the viewing frustum corresponds to the estimated 2D position of the object, the point-based detector of the 2D-detection model may then generate the estimated 3D position for the one or more depth measurements. In certain embodiments, the object detection and classification framework may then update the 2D-detection model based on a comparison between the estimated 3D position of the object and the predetermined 3D position of the object. For example, in some embodiments, updating the 2D-detection model may include updating one or more parameters of the 2D detector of the 2D-detection model, the 2D pipeline neural network, and the 3D pipeline neural network based on the results of the comparison between the estimated 3D position of the object and the predetermined 3D position of the object.

In certain embodiments, as previously noted, either in serially or in parallel, the object detection and classification framework may then train the 3D-detection model for detecting 3D positions of objects based on the depth measurements of the scene and the predetermined 3D position of the object. For example, in certain embodiments, training the 3D-detection model for detecting 3D positions of objects may include generating an estimated 3D position of the object by processing the depth measurements of the scene using the 3D-detection model. For example, in some embodiments, generating the estimated 3D position of the object may include determining, by the 3D pipeline neural network, the 3D set of feature vectors from the depth measurements of the scene. In some embodiments, the 3D set of feature vectors may correspond to the object in the depth measurements of the scene. In certain embodiments, a 3D detector of the 3D-detection model may then generate the estimated 3D position of the object in the depth measurements of the scene based on the 3D set of feature vectors received from the 3D pipeline neural network and the 2D set of feature vectors received from the 2D pipeline neural network.

In certain embodiments, the object detection and classification framework may then update the 3D-detection model based on a comparison between the estimated 3D position of the object and the predetermined 3D position of the object. For example, in some embodiments, updating the 3D-detection model may include updating one or more parameters of the 3D detector, the 3D pipeline neural network, and the 2D neural network based on the results of the comparison between the estimated 3D position of the object and the predetermined 3D position of the object. In this way, the present techniques may be provided to train each of the 2D object-detection pipeline and the 3D joint object-detection pipeline based on partial annotation training data, such that even for a particular training sample including only 3D annotation data, the 3D annotation data alone may be utilized as the ground truth data to train each of the 2D object-detection pipeline and the 3D joint object-detection pipeline. That is, even for a particular training sample including only 3D annotation data, the 3D annotation data alone may be utilized as the ground truth data to train each of the 2D object-detection pipeline and the 3D joint object-detection pipeline. In sum, the present techniques may not only leverage both 2D images (e.g., RGB images) and 3D point clouds (or 3D BEV representations) to improve the precision and recall of autonomous or semi-autonomous vehicle object detection and classification, but may also engender such improvements to the precision and recall in object detection and classification by training the 2D object-detection pipeline and the 3D joint object-detection pipeline based only a partial annotation dataset.

Figure 7:
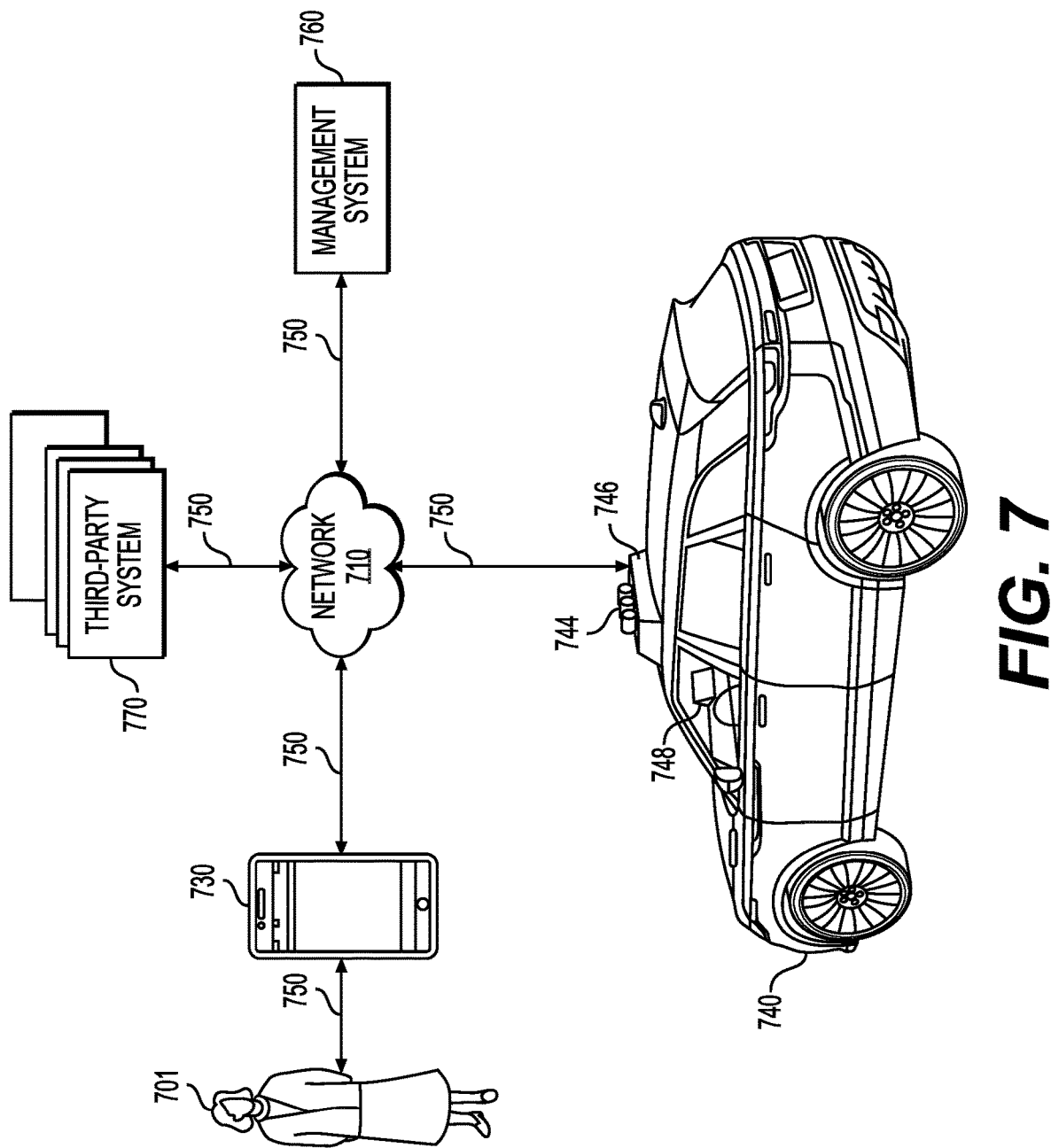
FIG. 7 illustrates an example block diagram of a transportation management environment.

FIG. 7 illustrates an example block diagram of a transportation management environment that may be utilized to perform one or more of the forgoing embodiments as discussed herein. In certain embodiments, the environment may include various computing entities, such as a user computing device 730 of a user 701 (e.g., a ride provider or requestor), a transportation management system 760, an autonomous or semi-autonomous vehicle 740, and one or more third-party system 770. The computing entities may be communicatively connected over any suitable network 710. For example, one or more portions of network 710 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In certain embodiments, any suitable network arrangement and protocol enabling the computing entities to communicate with each other may be used. Although FIG. 7 illustrates a single user device 730, a single transportation management system 760, a single vehicle 740, a plurality of third-party systems 770, and a single network 710, this disclosure contemplates any suitable number of each of these entities. For example, the network environment may include multiple users 701, user devices 730, transportation management system 760, autonomous or semi-autonomous vehicles 740, third-party systems 770, and networks 710.

The user device 730, transportation management system 760, autonomous or semi-autonomous vehicle 740, and third-party system 770 may be communicatively connected or co-located with each other in whole or in part. These computing entities may communicate via different transmission technologies and network types. For example, the user device 730 and the vehicle 740 may communicate with each other via a cable or short-range wireless communication (e.g., Bluetooth, NFC, WI-FI, and so forth), and together they may be connected to the Internet via a cellular network that is accessible to either one of the devices (e.g., the user device 730 may be a smartphone with LTE connection). The transportation management system 760 and third-party system 770, on the other hand, may be connected to the Internet via their respective LAN/WLAN networks and Internet Service Providers (ISP).

FIG. 7 illustrates transmission links 750 that connect user device 730, autonomous or semi-autonomous vehicle 740, transportation management system 760, and third-party system 770 to communication network 710. This disclosure contemplates any suitable transmission links 750, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In certain embodiments, one or more links 750 may connect to one or more networks 710, which may include in part, e.g., ad-hoc network, the Intranet, extranet, VPN, LAN, WLAN, WAN, WWAN, MAN, PSTN, a cellular network, a satellite network, or any combination thereof. The computing entities may not necessarily use the same type of transmission link 750. For example, the user device 730 may communicate with the transportation management system via a cellular network and the Internet but communicate with the autonomous vehicle 740 via Bluetooth or a physical wire connection.

In certain embodiments, the transportation management system 760 may fulfill ride requests for one or more users 701 by dispatching suitable vehicles. The transportation management system 760 may receive any number of ride requests from any number of ride requestors 701. In certain embodiments, a ride request from a ride requestor 701 may include an identifier that identifies the ride requestor in the system 760. The transportation management system 760 may utilize the identifier to access and store the ride requestor's 701 information, in accordance with the requestor's 701 privacy settings. The ride requestor's 701 information may be stored in one or more data stores (e.g., a relational database system) associated with and accessible to the transportation management system 760. In certain embodiments, ride requestor information may include profile information about a particular ride requestor 701.

In certain embodiments, the ride requestor 701 may be associated with one or more categories or types, through which the ride requestor 701 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when traveling at various speeds, route, and so forth), entertainment preferences and settings (e.g., preferred music genre or playlist, audio volume, display brightness, and so forth), temperature settings, whether conversation with the driver is welcomed, frequent destinations, historical riding patterns (e.g., time of day of travel, starting and ending locations, and so forth), preferred language, age, gender, or any other suitable information. In certain embodiments, the transportation management system 760 may classify a user 701 based on known information about the user 701 (e.g., using ML classifiers), and use the classification to retrieve relevant aggregate information associated with that class. For example, the system 760 may classify a user 701 as a young adult and retrieve relevant aggregate information associated with young adults, such as the type of music generally preferred by young adults.

Transportation management system 760 may also store and access ride information. Ride information may include locations related to the ride, traffic data, route options, optimal pick-up or drop-off locations for the ride, or any other suitable information associated with a ride. For example, when the transportation management system 760 receives a request to travel from San Francisco International Airport (SFO) to Palo Alto, Calif., the system 760 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride.

In certain embodiments, portions of the ride information may be based on historical data associated with historical rides facilitated by the system 760. For example, historical data may include aggregate information generated based on past ride information, which may include any ride information described herein and telemetry data collected by sensors in autonomous vehicles and/or user devices. Historical data may be associated with a particular user (e.g., that particular user's preferences, common routes, and so forth), a category/class of users (e.g., based on demographics), and/or all users of the system 760. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, and so forth.

As yet another example, historical data associated with all users may include general usage trends, such as traffic and ride patterns. Using historical data, the system 760 in certain embodiments may predict and provide ride suggestions in response to a ride request. In certain embodiments, the system 760 may utilize machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable ML algorithms known to persons of ordinary skill in the art. The ML models may be trained using any suitable training algorithm, including supervised learning based on labeled training data, unsupervised learning based on unlabeled training data, and/or semi-supervised learning based on a mixture of labeled and unlabeled training data.

In certain embodiments, transportation management system 760 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In certain embodiments, each server may include hardware, software, or embedded logic components or a combination of two or more such components for carrying out the appropriate functionalities implemented or supported by the server.

In certain embodiments, transportation management system 760 may include one or more data stores. The data stores may be used to store various types of information, such as ride information, ride requestor information, ride provider information, historical information, third-party information, or any other suitable type of information. In certain embodiments, the information stored in the data stores may be organized according to specific data structures. In certain embodiments, each data store may be a relational, columnar, correlation, or any other suitable type of database system. Although this disclosure describes or illustrates particular types of databases, this disclosure contemplates any suitable types of databases. Certain embodiments may provide interfaces that enable a user device 730 (which may belong to a ride requestor or provider), a transportation management system 760, vehicle system 740, or a third-party system 770 to process, transform, manage, retrieve, modify, add, or delete the information stored in the data store.

In certain embodiments, transportation management system 760 may include an authorization server (or any other suitable component(s)) that allows users 701 to opt-in to or opt-out of having their information and actions logged, recorded, or sensed by transportation management system 760 or shared with other systems (e.g., third-party systems 770). In certain embodiments, a user 701 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 701 of transportation management system 760 through blocking, data hashing, anonymization, or other suitable techniques as appropriate.

In certain embodiments, third-party system 770 may be a network-addressable computing system that may provide HD maps or host GPS maps, customer reviews, music or content, weather information, or any other suitable type of information. Third-party system 770 may generate, store, receive, and send relevant data, such as, for example, map data, customer review data from a customer review website, weather data, or any other suitable type of data. Third-party system 770 may be accessed by the other computing entities of the network environment either directly or via network 710. For example, user device 730 may access the third-party system 770 via network 710, or via transportation management system 760. In the latter case, if credentials are to be accessed the third-party system 770, the user 701 may provide such information to the transportation management system 760, which may serve as a proxy for accessing content from the third-party system 770.

In certain embodiments, user device 730 may be a mobile computing device such as a smartphone, tablet computer, or laptop computer. User device 730 may include one or more processors (e.g., CPU and/or GPU), memory, and storage. An operating system and applications may be installed on the user device 730, such as, e.g., a transportation application associated with the transportation management system 760, applications associated with third-party systems 770, and applications associated with the operating system. User device 730 may include functionality for determining its location, direction, or orientation, based on integrated sensors such as GPS, compass, gyroscope, or accelerometer. User device 730 may also include wireless transceivers for wireless communication and may support wireless communication protocols such as Bluetooth, near-field communication (NFC), infrared (IR) communication, WI-FI, and/or 2G/3G/4G/LTE/5G mobile communication standard. User device 730 may also include one or more cameras, scanners, touchscreens, microphones, speakers, and any other suitable input-output devices.

In certain embodiments, the vehicle 740 may be an autonomous or semi-autonomous vehicle and equipped with an array of sensors 744, a navigation system 746, and a ride-service computing device 748. In certain embodiments, a fleet of autonomous or semi-autonomous vehicles 740 may be managed by the transportation management system 760. The fleet of autonomous vehicles 740, in whole or in part, may be owned by the entity associated with the transportation management system 760, or they may be owned by a third-party entity relative to the transportation management system 760. In either case, the transportation management system 760 may control the operations of the autonomous vehicles 740, including, e.g., dispatching select vehicles 740 to fulfill ride requests, instructing the vehicles 740 to perform select operations (e.g., head to a service center or charging/fueling station, pull over, stop immediately, self-diagnose, lock/unlock compartments, change music station, change temperature, and any other suitable operations), and instructing the vehicles 740 to enter select operation modes (e.g., operate normally, drive at a reduced speed, drive under the command of human operators, and any other suitable operational modes).

In certain embodiments, the autonomous or semi-autonomous vehicles 740 may receive data from and transmit data to the transportation management system 760 and the third-party system 770. Example of received data may include, e.g., instructions, new software or software updates, maps, 3D models, trained or untrained ML models, location information (e.g., location of the ride requestor, the autonomous or semi-autonomous vehicle 740 itself, other vehicles 740, and target destinations such as service centers), navigation information, traffic information, weather information, entertainment content (e.g., music, video, and news) ride requestor information, ride information, and any other suitable information. Examples of data transmitted from the autonomous or semi-autonomous vehicle 740 may include, e.g., telemetry and sensor data, determinations/decisions based on such data, vehicle condition or state (e.g., battery/fuel level, tire and brake conditions, sensor condition, speed, odometer, and so forth), location, navigation data, passenger inputs (e.g., through a user interface in the vehicle 740, passengers may send/receive data to the transportation management system 760 and/or third-party system 770), and any other suitable data.

In certain embodiments, autonomous or semi-autonomous vehicles 740 may also communicate with each other as well as other traditional human-driven vehicles, including those managed and not managed by the transportation management system 760. For example, one vehicle 740 may communicate with another vehicle data regarding their respective location, condition, status, sensor reading, and any other suitable information. In certain embodiments, vehicle-to-vehicle communication may take place over direct short-range wireless connection (e.g., WI-FI, Bluetooth, NFC) and/or over a network (e.g., the Internet or via the transportation management system 760 or third-party system 770).

In certain embodiments, an autonomous or semi-autonomous vehicle 740 may obtain and process sensor/telemetry data. Such data may be captured by any suitable sensors. For example, the vehicle 740 may have a LiDAR sensor array of multiple LiDAR transceivers that are configured to rotate 360°, emitting pulsed laser light and measuring the reflected light from objects surrounding vehicle 740. In certain embodiments, LiDAR transmitting signals may be steered by use of a gated light valve, which may be a MEMs device that directs a light beam using the principle of light diffraction. Such a device may not use a gimbaled mirror to steer light beams in 360° around the autonomous or semi-autonomous vehicle. Rather, the gated light valve may direct the light beam into one of several optical fibers, which may be arranged such that the light beam may be directed to many discrete positions around the autonomous or semi-autonomous vehicle. Thus, data may be captured in 360° around the autonomous or semi-autonomous vehicle, but no rotating parts may be necessary. A LiDAR is an effective sensor for measuring distances to targets, and as such may be used to generate a 3D model of the external environment of the autonomous or semi-autonomous vehicle 740. For example, the 3D model may represent the external environment including objects such as other cars, curbs, debris, objects, and pedestrians up to a maximum range of the sensor arrangement (e.g., 50 meters, 100 meters, or 200 meters).

As another example, the autonomous or semi-autonomous vehicle 740 may have optical cameras pointing in different directions. The cameras may be used for, e.g., recognizing roads, lane markings, street signs, traffic lights, police, other vehicles, and any other visible objects of interest. To enable the vehicle 740 to "see" at night, infrared cameras may be installed. In certain embodiments, the vehicle may be equipped with stereo vision for, e.g., spotting hazards such as pedestrians or tree branches on the road. As another example, the vehicle 740 may have radars for, e.g., detecting other vehicles and/or hazards afar. Furthermore, the vehicle 740 may have ultrasound equipment for, e.g., parking and obstacle detection. In addition to sensors enabling the vehicle 740 to detect, measure, and understand the external world around it, the vehicle 740 may further be equipped with sensors for detecting and self-diagnosing the vehicle's own state and condition. For example, the vehicle 740 may have wheel sensors for, e.g., measuring velocity; global positioning system (GPS) for, e.g., determining the vehicle's current geolocation; and/or inertial measurement units, accelerometers, gyroscopes, and/or odometer systems for movement or motion detection.

While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, an autonomous vehicle 740 may build a 3D model of its surrounding based on data from its LiDAR, radar, sonar, and cameras, along with a pre-generated map obtained from the transportation management system 760 or the third-party system 770. Although sensors 744 appear in a particular location on autonomous vehicle 740 in FIG. 7, sensors 744 may be located in any suitable location in or on the autonomous or semi-autonomous vehicle 740. Example locations for sensors include the front and rear bumpers, the doors, the front windshield, on the side panel, or any other suitable location.

In certain embodiments, the autonomous vehicle 740 may be equipped with a processing unit (e.g., one or more CPUs and GPUs), memory, and storage. The vehicle 740 may thus be equipped to perform a variety of computational and processing tasks, including processing the sensor data, extracting useful information, and operating accordingly. For example, based on images captured by its cameras and a machine-vision model, the vehicle 740 may identify particular types of objects captured by the images, such as pedestrians, other vehicles, lanes, curbs, and any other objects of interest. In certain embodiments, the autonomous vehicle 740 may have a navigation system 746 responsible for safely navigating the autonomous vehicle 740. In certain embodiments, the navigation system 746 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 746 may also utilize, e.g., map data, traffic data, accident reports, weather reports, instructions, target destinations, and any other suitable information to determine navigation routes and particular driving operations (e.g., slowing down, speeding up, stopping, swerving, and so forth). In certain embodiments, the navigation system 746 may utilize its determinations to control the vehicle 740 to operate in prescribed manners and to guide the autonomous vehicle 740 to its destinations without colliding into other objects. Although the physical embodiment of the navigation system 746 (e.g., the processing unit) appears in a particular location on autonomous vehicle 740 in FIG. 7, navigation system 746 may be located in any suitable location in or on autonomous vehicle 740. Example locations for navigation system 746 include inside the cabin or passenger compartment of autonomous vehicle 740, near the engine/battery, near the front seats, rear seats, or in any other suitable location.

In certain embodiments, the autonomous or semi-autonomous vehicle 740 may be equipped with a ride-service computing device 748, which may be a tablet computer, or any other suitable device installed by transportation management system 760 to allow the user to interact with the autonomous vehicle 740, transportation management system 760, other users 701, or third-party systems 770. In certain embodiments, installation of ride-service computing device 748 may be accomplished by placing the ride-service computing device 748 inside autonomous vehicle 740, and further configuring it to communicate with the vehicle 740 via a wire or wireless connection (e.g., via Bluetooth). Although FIG. 7 illustrates a single ride-service computing device 748 at a particular location in autonomous vehicle 740, autonomous or semi-autonomous vehicle 740 may include several ride-service computing devices 748 in several different locations within the vehicle.

For example, the autonomous or semi-autonomous vehicle 740 may include four ride-service computing devices 748 located in the following places: one in front of the front-left passenger seat (e.g., driver's seat in traditional U.S. automobiles), one in front of the front-right passenger seat, one in front of each of the rear-left and rear-right passenger seats. In certain embodiments, ride-service computing device 748 may be detachable from any component of autonomous vehicle 740. This may allow users to handle ride-service computing device 748 in a manner consistent with other tablet computing devices. For example, a user may move ride-service computing device 748 to any location in the cabin or passenger compartment of the autonomous or semi-autonomous vehicle 740, may hold ride-service computing device 748, or handle ride-service computing device 748 in any other suitable manner. Although this disclosure describes providing a particular computing device in a particular manner, this disclosure contemplates providing any suitable computing device in any suitable manner.

Figure 8:
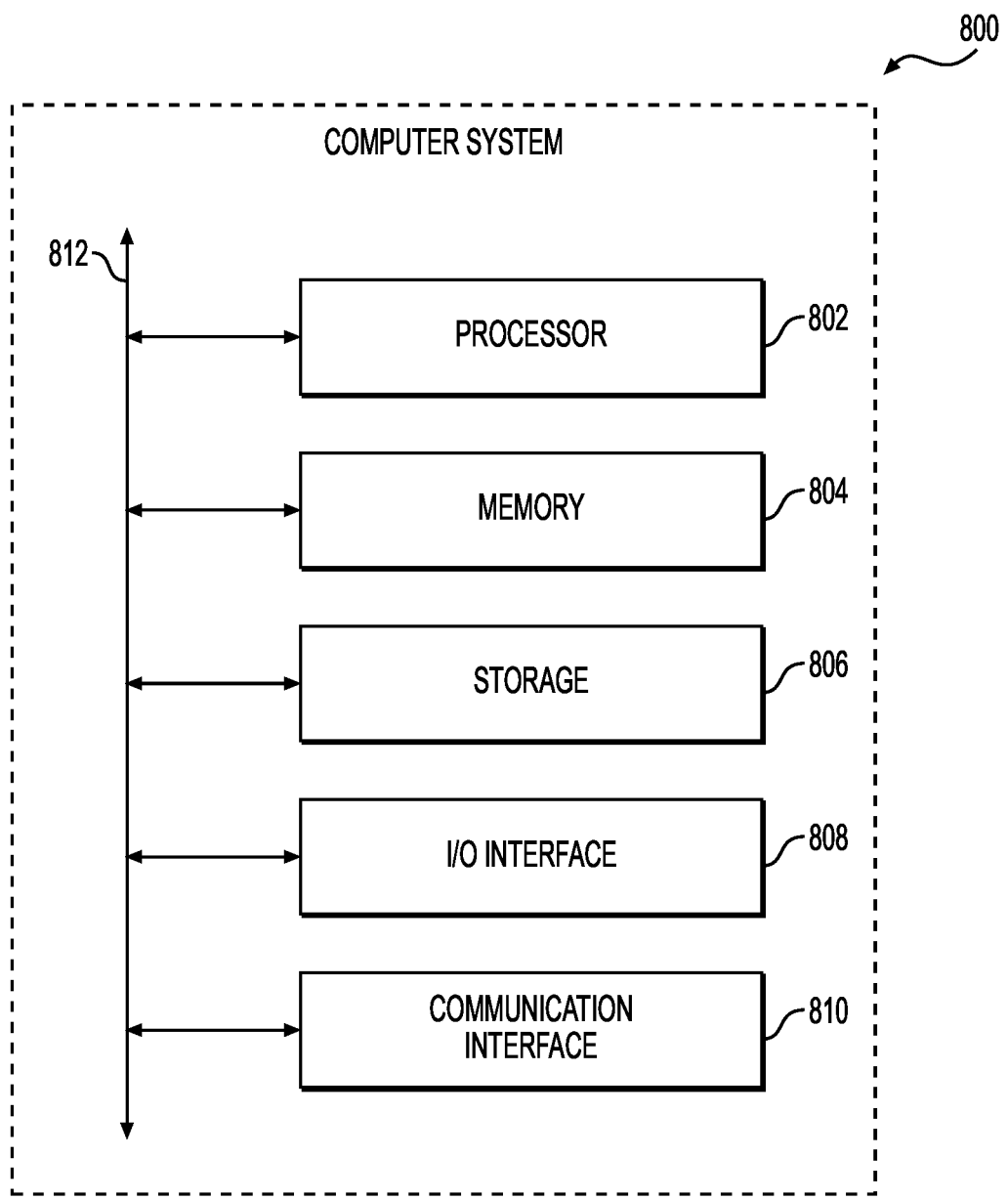
FIG. 8 illustrates an example of a computing system.

FIG. 8 illustrates an example computer system 800 that may be utilized to perform one or more of the forgoing embodiments as discussed herein. In certain embodiments, one or more computer systems 800 perform one or more steps of one or more methods described or illustrated herein. In certain embodiments, one or more computer systems 800 provide the functionalities described or illustrated herein. In certain embodiments, software running on one or more computer systems 800 performs one or more steps of one or more methods described or illustrated herein or provides the functionalities described or illustrated herein. Certain embodiments include one or more portions of one or more computer systems 800. Herein, a reference to a computer system may encompass a computing device, and vice versa, where appropriate. Moreover, a reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. For example, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In certain embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement. In certain embodiments, processor 802 includes hardware for executing instructions, such as those making up a computer program. For example, to execute instructions, processor 802 may retrieve (or fetch) the instructions from an internal register, an internal cache, memory 804, or storage 806; decode and execute them; and then write one or more results to an internal register, an internal cache, memory 804, or storage 806. In certain embodiments, processor 802 may include one or more internal caches for data, instructions, or addresses. This disclosure contemplates processor 802 including any suitable number of any suitable internal caches, where appropriate. For example, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 that are to be operated on by computer instructions; the results of previous instructions executed by processor 802 that are accessible to subsequent instructions or for writing to memory 804 or storage 806; or any other suitable data. The data caches may speed up read or write operations by processor 802. The TLBs may speed up virtual-address translation for processor 802. In certain embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs), be a multi-core processor, or include one or more processors 802. Although this disclosure describes and illustrates a particular processor, this disclosure contemplates any suitable processor.

In certain embodiments, memory 804 includes main memory for storing instructions for processor 802 to execute or data for processor 802 to operate on. For example, computer system 800 may load instructions from storage 806 or another source (such as another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804.

In certain embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described in further detail below. In certain embodiments, one or more memory management units (MMUs) reside between processor 802 and memory 804 and facilitate accesses to memory 804 requested by processor 802. In certain embodiments, memory 804 includes random access memory (RAM). This RAM may be volatile memory, where appropriate. Where appropriate, this RAM may be dynamic RAM (DRAM) or static RAM (SRAM).

Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In certain embodiments, storage 806 includes mass storage for data or instructions. For example, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In certain embodiments, storage 806 is non-volatile, solid-state memory. In certain embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In certain embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. For example, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In certain embodiments, communication interface 810 includes hardware, software, or both providing one or more interfaces for communication (such as, for example, packet-based communication) between computer system 800 and one or more other computer systems 800 or one or more networks. For example, communication interface 810 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 810 for it. For example, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In certain embodiments, bus 812 includes hardware, software, or both coupling components of computer system 800 to each other. As an example and not by way of limitation, bus 812 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such as field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both,"

unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates certain embodiments as providing particular advantages, certain embodiments may provide none, some, or all of these advantages.

The invention claimed is:

1. A method comprising, by a computing system:
   accessing a training sample comprising (1) an image of a scene including an object, (2) depth measurements of the scene, and (3) a predetermined 3D position of an object in the scene;
   training a 3D-detection model for detecting 3D positions of objects based on at least the depth measurement of the scene and the predetermined 3D position of the object; and
   training a 2D-detection model for detecting 2D positions of objects within images by:
      generating an estimated 2D position of the object within the image by processing the image using the 2D-detection model;
      determining a subset of the depth measurements that correspond to the object based on the estimated 2D position of the object within the image and a viewpoint from which the image is captured;
      generating an estimated 3D position of the object based on the subset of the depth measurements; and
      updating the 2D-detection model based on a comparison between the estimated 3D position of the object and the predetermined 3D position of the object.

2. The method of claim 1, wherein generating the estimated 2D position of the object further comprises:
   determining, by a first neural network of the 2D-detection model, a first set of feature vectors from the image of the scene, the first set of feature vectors corresponding to the object in the image of the scene; and
   generating, by a 2D detector of the 2D-detection model, the estimated 2D position of the object in the image of the scene based on the first set of feature vectors received from the first neural network and a second set of feature vectors received from a second neural network of the 3D-detection model, the second set of feature vectors corresponding to the object in the depth measurements of the scene.

3. The method of claim 2, wherein updating the 2D-detection model further comprises updating one or more parameters of the 2D detector, the first neural network, and the second neural network.

4. The method of claim 1, wherein determining the subset of the depth measurements that correspond to the object further comprises generating a viewing frustum based on the estimated 2D position of the object, a pose associated with a sensor that captured the image of the scene, and the depth measurements of the scene.

5. The method of claim 4, wherein generating the estimated 3D position of the object further comprises:
   determining whether one or more of the depth measurements lying within the viewing frustum corresponds to the estimated 2D position of the object; and
   in response to determining that the one or more of the depth measurements lying within the viewing frustum corresponds to the estimated 2D position of the object, generating the estimated 3D position for the one or more of the depth measurements.

6. The method of claim 1, wherein training the 3D-detection model for detecting 3D positions of objects further comprises:
   generating an estimated 3D position of the object by processing the depth measurements of the scene using the 3D-detection model; and
   updating the 3D-detection model based on a comparison between the estimated 3D position of the object and the predetermined 3D position of the object.

7. The method of claim 6, wherein generating the estimated 3D position of the object further comprises:
   determining, by a first neural network of the 3D-detection model, a first set of feature vectors from the depth measurements of the scene, the first set of feature vectors corresponding to the object in the depth measurements of the scene; and
   generating, by a 3D detector of the 3D-detection model, the estimated 3D position of the object in the depth measurements of the scene based on the first set of feature vectors received from the first neural network and a second set of feature vectors received from a second neural network of the 2D-detection model, the second set of feature vectors corresponding to the estimated 2D position of the object.

8. The method of claim 7, wherein updating the 3D-detection model further comprises updating one or more parameters of the 3D detector, the first neural network, and the second neural network.

9. The method of claim 1, further comprising:
   accessing a second training sample comprising (1) a second image of the scene, (2) second depth measurements of the scene, and (3) a predetermined 2D position of the object in the scene; and
   training the 2D-detection model for detecting 2D positions of objects based on at least the second image of the scene and the predetermined 2D position of the object.

10. The method of claim 9, wherein training the 2D-detection model for detecting 2D positions of objects further comprises:
   determining, by a first neural network of the 2D-detection model, a first set of feature vectors from the image of the scene, the first set of feature vectors corresponding to the object in the image of the scene; and generating, by a 2D detector of the 2D-detection model, an estimated 2D position for the object in the image of the scene based on the first set of feature vectors received from the first neural network and a second set of feature vectors received from a second neural network of the 3D-detection model, the second set of feature vectors corresponding to the object in the depth measurements of the scene.

11. The method of claim 10, further comprising updating the 2D-detection model based on a comparison between the estimated 2D position and the predetermined 2D position of the object.

12. The method of claim 1, further comprising training the 3D-detection model and training the 2D-detection model concurrently.

13. A system comprising:
one or more non-transitory computer-readable storage media including instructions; and
one or more processors coupled to the one or more non-transitory computer-readable storage media, the one or more processors configured to execute the instructions to:
access a training sample comprising (1) an image of a scene including an object, (2) depth measurements of the scene, and (3) a predetermined 3D position of an object in the scene;
train a 3D-detection model for detecting 3D positions of objects based on at least the depth measurement of the scene and the predetermined 3D position of the object; and
train a 2D-detection model for detecting 2D positions of objects within images by:
generate an estimated 2D position of the object within the image by processing the image using the 2D-detection model;
determine a subset of the depth measurements that correspond to the object based on the estimated 2D position of the object within the image and a viewpoint from which the image is captured;
generate an estimated 3D position of the object based on the subset of the depth measurements; and
update the 2D-detection model based on a comparison between the estimated 3D position of the object and the predetermined 3D position of the object.

14. The system of claim 13, wherein the instructions to generate the estimated 2D position of the object further comprises instructions to:
determine, by a first neural network of the 2D-detection model, a first set of feature vectors from the image of the scene, the first set of feature vectors corresponding to the object in the image of the scene; and
generate, by a 2D detector of the 2D-detection model, the estimated 2D position of the object in the image of the scene based on the first set of feature vectors received from the first neural network and a second set of feature vectors received from a second neural network of the 3D-detection model, the second set of feature vectors corresponding to the object in the depth measurements of the scene.

15. The system of claim 14, wherein the instructions to update the 2D-detection model further comprises instructions to update one or more parameters of the 2D detector, the first neural network, and the second neural network.

16. The system of claim 13, wherein the instructions to determine the subset of the depth measurements that correspond to the object further comprises instructions to generate a viewing frustum based on the estimated 2D position of the object, a pose associated with a sensor that captured the image of the scene, and the depth measurements of the scene.

17. The system of claim 16, wherein the instructions to generate the estimated 3D position of the object further comprises instructions to:
determine whether one or more of the depth measurements lying within the viewing frustum corresponds to the estimated 2D position of the object; and
in response to determining that the one or more of the depth measurements lying within the viewing frustum corresponds to the estimated 2D position of the object, generate the estimated 3D position for the one or more of the depth measurements.

18. The system of claim 13, wherein the instructions to train the 3D-detection model for detecting 3D positions of objects further comprises instructions to:
generate an estimated 3D position of the object by processing the depth measurements of the scene using the 3D-detection model; and
update the 3D-detection model based on a comparison between the estimated 3D position of the object and the predetermined 3D position of the object.

19. The system of claim 18, wherein the instructions to generate the estimated 3D position of the object further comprises instructions to:
determine, by a first neural network of the 3D-detection model, a first set of feature vectors from the depth measurements of the scene, the first set of feature vectors corresponding to the object in the depth measurements of the scene; and
generate, by a 3D detector of the 3D-detection model, the estimated 3D position of the object in the depth measurements of the scene based on the first set of feature vectors received from the first neural network and a second set of feature vectors received from a second neural network of the 2D-detection model, the second set of feature vectors corresponding to the estimated 2D position of the object.

20. A non-transitory computer-readable medium comprising instructions that, when executed by one or more processors of a computing system, cause the one or more processors to:
access a training sample comprising (1) an image of a scene including an object, (2) depth measurements of the scene, and (3) a predetermined 3D position of an object in the scene;
train a 3D-detection model for detecting 3D positions of objects based on at least the depth measurement of the scene and the predetermined 3D position of the object; and
train a 2D-detection model for detecting 2D positions of objects within images by:
generate an estimated 2D position of the object within the image by processing the image using the 2D-detection model;
determine a subset of the depth measurements that correspond to the object based on the estimated 2D position of the object within the image and a viewpoint from which the image is captured;
generate an estimated 3D position of the object based on the subset of the depth measurements; and
update the 2D-detection model based on a comparison between the estimated 3D position of the object and the predetermined 3D position of the object.

* * * * *